(12) United States Patent
Sathyanarayanan et al.

(10) Patent No.: US 11,708,812 B2
(45) Date of Patent: Jul. 25, 2023

(54) ENERGY HARVESTING DEVICE CONVERTING MULTIAXIAL TRANSLATIONAL AND ROTATIONAL MOTION TO UNIDIRECTIONAL ROTATIONAL MOTION

(71) Applicants: Sacheth Sathyanarayanan, Chennai (IN); Sairandri Sathyanarayanan, Chennai (IN)

(72) Inventors: Sacheth Sathyanarayanan, Chennai (IN); Sairandri Sathyanarayanan, Chennai (IN)

( * ) Notice: Subject to any disclaimer, the term of this patent is extended or adjusted under 35 U.S.C. 154(b) by 1037 days.

(21) Appl. No.: 16/454,201

(22) Filed: Jun. 27, 2019

(65) Prior Publication Data

US 2019/0316562 A1 Oct. 17, 2019

Related U.S. Application Data

(63) Continuation-in-part of application No. 15/486,643, filed on Apr. 13, 2017, now Pat. No. 10,337,487.

(30) Foreign Application Priority Data

May 17, 2016 (IN) .............................. 201641017034
Sep. 3, 2016 (IN) .............................. 201641030185

(51) Int. Cl.
*F03B 13/14* (2006.01)
*F16H 41/24* (2006.01)
(Continued)

(52) U.S. Cl.
CPC ................ *F03B 13/14* (2013.01); *F03B 1/00* (2013.01); *F03B 13/16* (2013.01); *F16H 1/46* (2013.01); *F16H 3/003* (2013.01); *F16H 3/0915* (2013.01); *F16H 41/24* (2013.01); *F16H 57/0471* (2013.01); *F16H 61/48* (2013.01);
(Continued)

(58) Field of Classification Search
CPC .. F03B 13/14; F03B 1/00; F03B 13/16; F16H 41/24; F16H 61/48; F05B 2260/4031; F05B 2260/5032; F05B 2260/40311
See application file for complete search history.

(56) References Cited

U.S. PATENT DOCUMENTS 613,075 A 10/1898 Pitts
1,925,742 A 9/1933 Bamber et al.
(Continued)

FOREIGN PATENT DOCUMENTS

CN 102767463 B 7/2014
WO 2006/118482 A1 11/2006
(Continued)

OTHER PUBLICATIONS

International Search Report and Written Opinion of the International Searching Authority dated Jun. 1, 2017 regarding PCT/IB2017/052176.
(Continued)

*Primary Examiner* — Joseph Ortega
(74) *Attorney, Agent, or Firm* — Harness, Dickey & Pierce, P.L.C.

(57) ABSTRACT

An energy harnessing device for harnessing wave energy that results in pitch, sway, yaw, surge, roll, and heave movement, wherein the device effectively converts multi-axial translational and rotational motion to unidirectional rotational motion for power transmission.

15 Claims, 35 Drawing Sheets

(51) Int. Cl.
*F16H 61/48* (2006.01)
*F03B 1/00* (2006.01)
*F03B 13/16* (2006.01)
*F16H 1/46* (2006.01)
*F16H 3/00* (2006.01)
*F16H 3/091* (2006.01)
*F16H 57/04* (2010.01)

(52) U.S. Cl.
CPC ............... *F05B 2260/4031* (2013.01); *F05B 2260/5032* (2013.01)

(56) References Cited

U.S. PATENT DOCUMENTS

| | | |
|---|---|---|
| 4,352,023 A | 9/1982 | Sachs et al. |
| 4,966,254 A | 10/1990 | Nakano |
| 6,247,308 B1 | 6/2001 | Solell |
| 8,129,852 B2 | 3/2012 | Edwards et al. |
| 2010/0025999 A1 | 2/2010 | Kim et al. |
| 2010/0319340 A1 | 12/2010 | Wickett |
| 2016/0123439 A1 | 5/2016 | Barrett |
| 2017/0009734 A1 | 1/2017 | Vamvas |
| 2019/0316562 A1 | 10/2019 | Sathyanarayanan |

FOREIGN PATENT DOCUMENTS

| | | |
|---|---|---|
| WO | 2009/101085 A2 | 8/2009 |
| WO | 2017199113 A1 | 11/2017 |
| WO | 2019103510 A1 | 5/2019 |

OTHER PUBLICATIONS

International Search Report and Written Opinion dated Aug. 21, 2020 in International Application No. PCT/US2020/039540.

ENERGY HARVESTING DEVICE CONVERTING MULTIAXIAL TRANSLATIONAL AND ROTATIONAL MOTION TO UNIDIRECTIONAL ROTATIONAL MOTION

CROSS-REFERENCE TO RELATED APPLICATIONS

This application is a continuation-in-part of U.S. patent application Ser. No. 15/486,643 filed on Apr. 13, 2017, issued as U.S. Pat. No. 10,337,487, which claims the benefit and priority of Indian Provisional Application No. 201641017034, filed May 17, 2016, and Indian Provisional Application No. 201641030185, filed Sep. 3, 2016. The entire disclosure of each of the above applications is incorporated herein by reference.

FIELD

The present disclosure relates to energy harvesting devices and, more particularly, relates to an energy harvesting device that converts multiaxial translational and rotational motion to unidirectional rotational motion.

BACKGROUND AND SUMMARY

This section provides background information related to the present disclosure which is not necessarily prior art. This section also provides a general summary of the disclosure, and is not a comprehensive disclosure of its full scope or all of its features Global warming is a household phrase today and does not require any additional explanation or discussion. Nations are willing to spend billions to stop global warming at current levels and not worsen the situation. A great focus is on developing unconventional or renewable energy sources. Unmistakably, the Solar and Wind Energy technologies have progressed significantly that a great emphasis is laid on exploiting these sources. Wave and Tidal energy are still in the initial development stages and it is only a few countries in Europe and the USA that are devoting resources to exploit them.

Solar energy is available only during the day time and lack of energy storage devices pose as a significant disadvantage. The sun energy is at the lowest during the daybreak, peaks at noon and wanes to low levels at sunset. During the day, average solar energy supply increases to a peak then decreases and does not remain constant. When solar energy decreases to low levels during the day or when it drops to zero during the night, alternate energy sources must be available to keep up with the demand. Harnessing solar power requires substantial capital and above that additional investment is required to maintain and establish alternate sources to match demand when the sun recedes. Moreover countries farther away from the equator do not qualify as potential candidates.

Likewise, wind energy is seasonal. Even during windy seasons, wind does not remain constant and varies periodically. Similar to Solar Energy, Wind Energy systems also require investment in stand-by sources to keep up with the demand when the winds slow down or drop to insignificant levels.

On the other hand, wave energy, when compared to the other two, is more reliable. Over a wider time period a reasonably unceasing wave power supply can be expected. The energy variations are, however, not as significant as Solar and Wind Energy. But in shorter time intervals (in minutes and seconds) Wave Power fluctuates momentarily. This requires a wave power absorption and conversion system that can store momentary peak power and release for supplementation during momentary periods of low power. The Wave Power industry today stores this momentary excess energy in a battery as electrical energy or in a pressure vessel as pressure energy. The stored energy is utilized within short periods of time (minutes or seconds) and do not necessitate long term (in hours or days) storage. The present wave energy conversion devices either directly run an electric generator that stores electric energy in battery banks or operates a hydraulic motor that stores pressure energy in pressure vessels. The stored pressure is then released at a constant rate to run a hydraulic turbine/motor coupled to an electric generator.

A problem faced by the Wave Power Industry is sudden strikes by higher intensity waves. During a given time period, kinetic forces associated with each wave is predominantly constant. However, it is not uncommon to observe a wave break with very less force or on the contrary one with much higher magnitude of force. This requires the Wave Energy Absorption and Conversion system to be adequately designed for waves with the higher magnitude to avoid structural failures.

In conventional systems or apparatus that absorb and convert wave energy, only one or two of the ocean movements (pitch, sway, yaw, surge, roll and heave) are absorbed or converted (see FIGS. 1B and 1C). The forces associated with the other remaining motions are not absorbed and hence the apparatus is required to structurally withstand these forces. As these non-absorbed forces strike from different directions the apparatus requires considerable strengthening in all dimensions to withstand the resultant stresses. To increase the strength material selection and higher yield strengths will help to an extent. Beyond which the size will require an increase. Increased size will expose more surface area to the ocean movement that result in higher forces and thus the designer faces a vicious circle. Ultimately a bulky, heavy, hard to handle, expensive structure is required to absorb and convert relatively low power.

In reality, a free floating device made of resilient material left on the ocean water surface that is not tied up, fixed, or moored will float, pitch, sway, yaw, surge, roll, and heave with the waves. The stress experienced by this device is not significant and is mainly due to its own weight and geometry. Let this floating device be attached to a structural member (a beam, shaft, arm, etc.) to actuate a device (electric generator or pressure pump) to absorb or convert the energy transferred to the floating device by the waves. If the member is allowed freedom of motion only in the "Y" direction to absorb heave motion, then when other motions like sway, pitch, surge, etc. accompany the heave motion this member has to perform two functions—one to convey the heave motion to the device for absorption and conversion of the heave forces and other to hold the floating device in place by withstanding the unused forces caused by motions associated with sway, pitch, surge etc. This results in other complex forces like bending, shear, torsion etc. that this member has to withstand.

This disadvantage is eliminated or reduced significantly by the system of the present teachings, which is capable of absorbing forces associated with all ocean motions, including pitch, sway, yaw, surge, roll, and heave. The forces generated on the system will be equal to resistance offered by the hydraulic pump or the electrical generator.

Additionally, all these multi-directional forces are absorbed and focused into a one directional rotational motion. This eliminates the requirement to design the structure for all types of multi directional forces. The structure will experience forces equal to resistance offered by the hydraulic pump or the electrical generator. The principle component of this system will be the gear box which will be designed to absorb all types of forces associated with all motions of the ocean. The maximum forces applied on the gear box will only equal to the resistance offered by the hydraulic pump or the electrical generator. The primary function of the structure is only to support the gear box.

The gear box can be scaled up or down based on the power requirement dictated by the specifications of the selected electrical generator or hydraulic motor. The size and strength of the structure will be designed simply to support the gear box.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
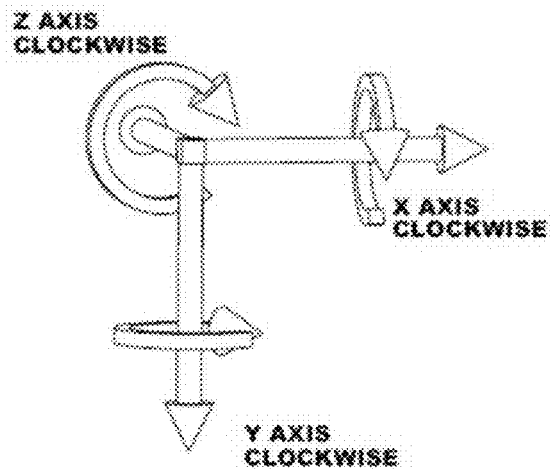
FIG. 1A represents rotational and directional classification according to the present disclosure.
Figure 1B:
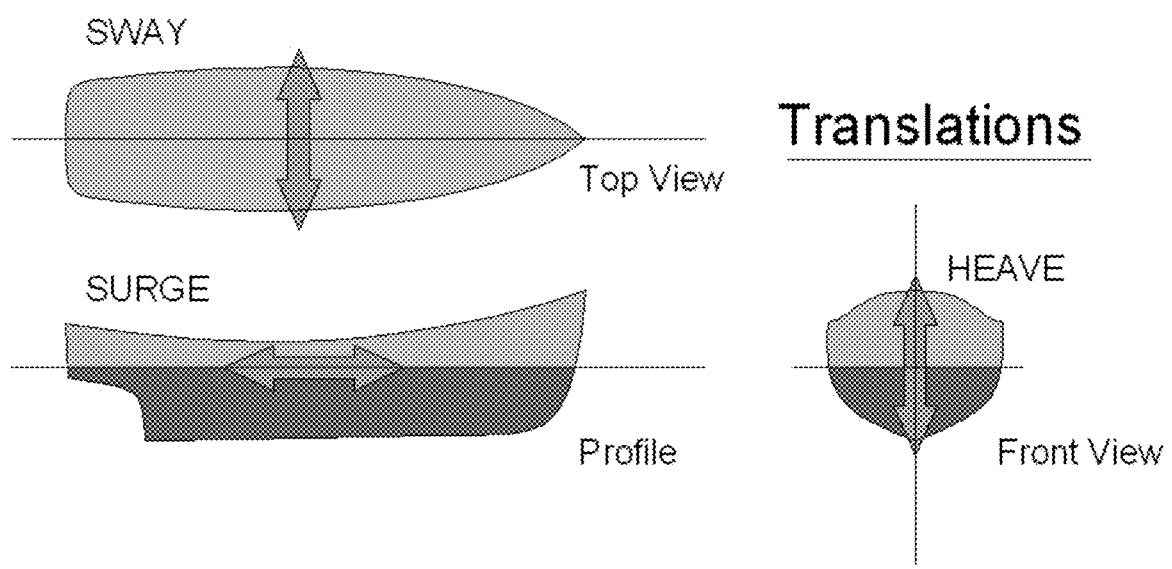
FIG. 1B illustrates translational motions of waves.
Figure 1C:
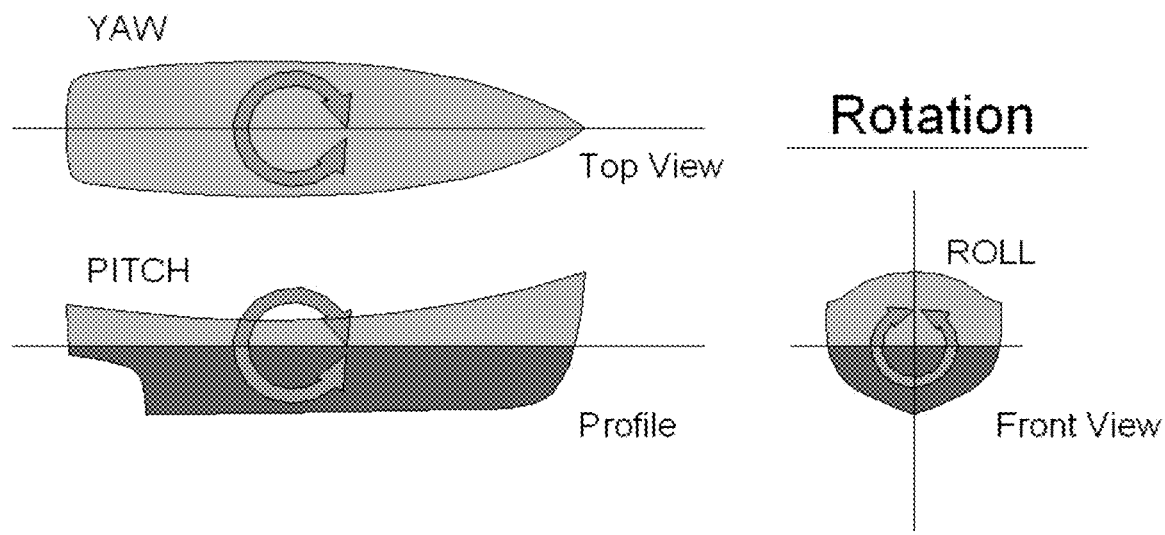
FIG. 1C illustrates rotational motions of waves.
Figure 2:
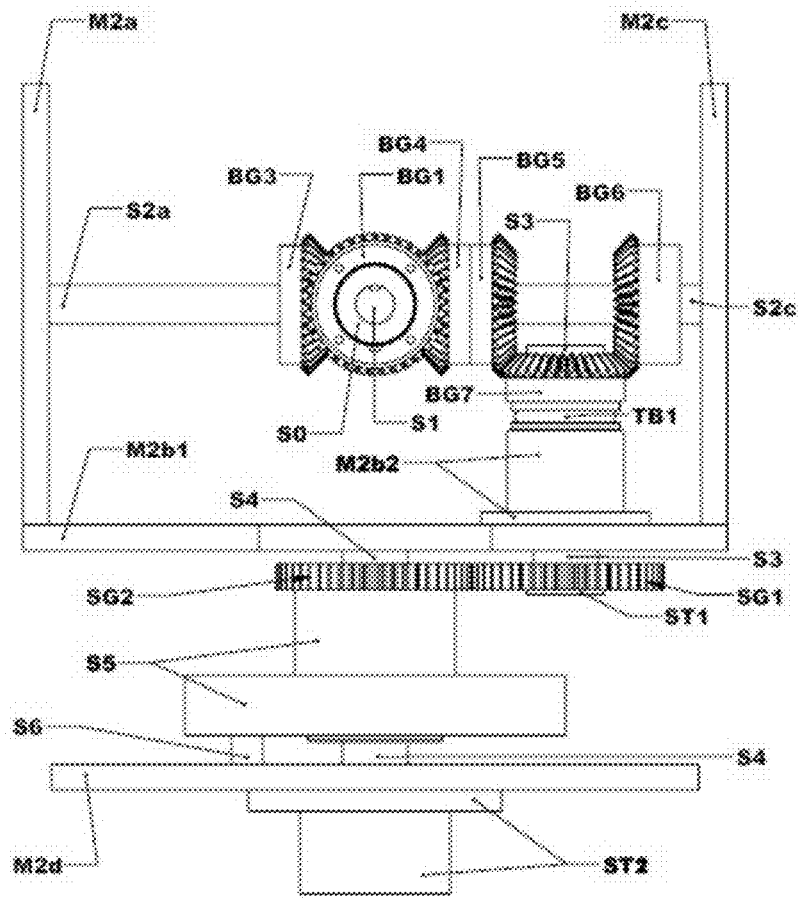
FIG. 2 illustrates a front view of an energy harvesting device according to the principles of the present teachings.
Figure 3:
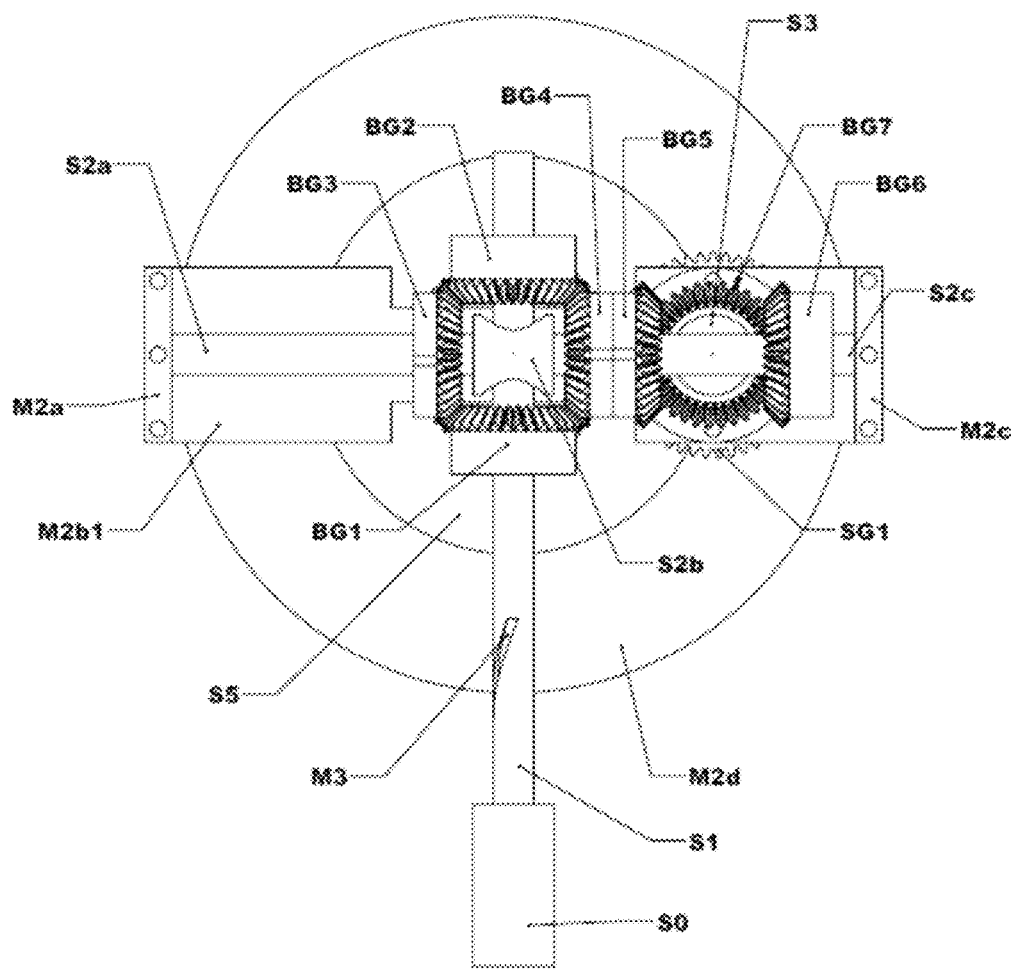
FIG. 3 illustrates a plan view of the energy harvesting device according to the principles of the present teachings.
Figure 4:
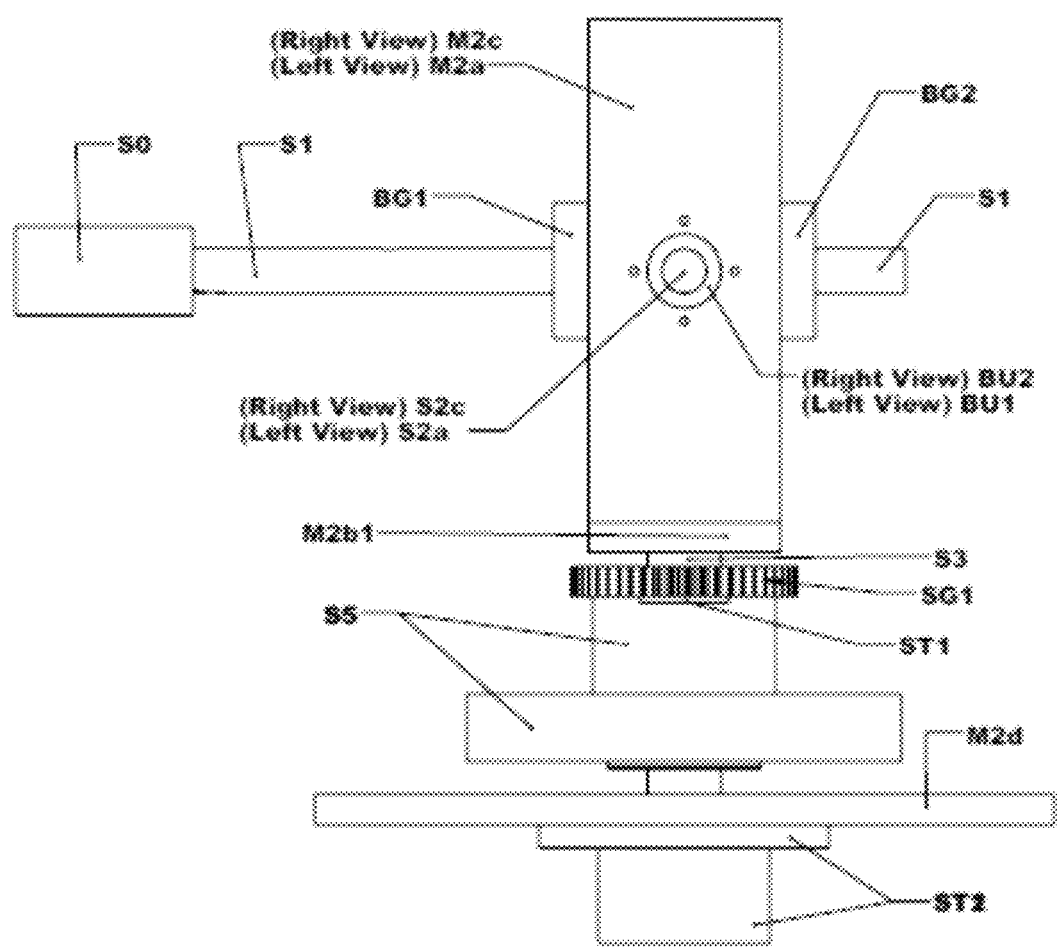
FIG. 4 illustrates a side view of the energy harvesting device according to the principles of the present teachings.
Figure 5:
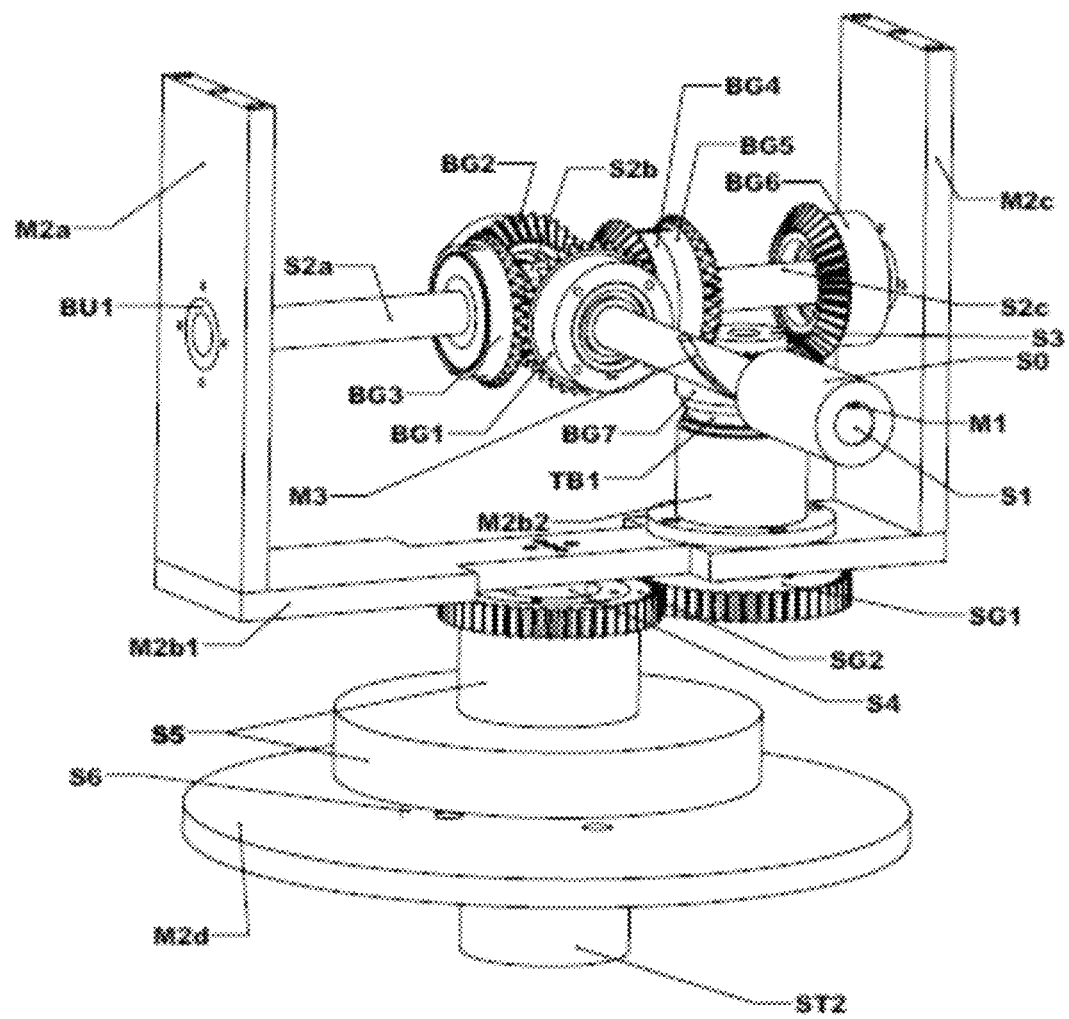
FIG. 5 illustrates a first perspective view of the energy harvesting device according to the principles of the present teachings.
Figure 6:
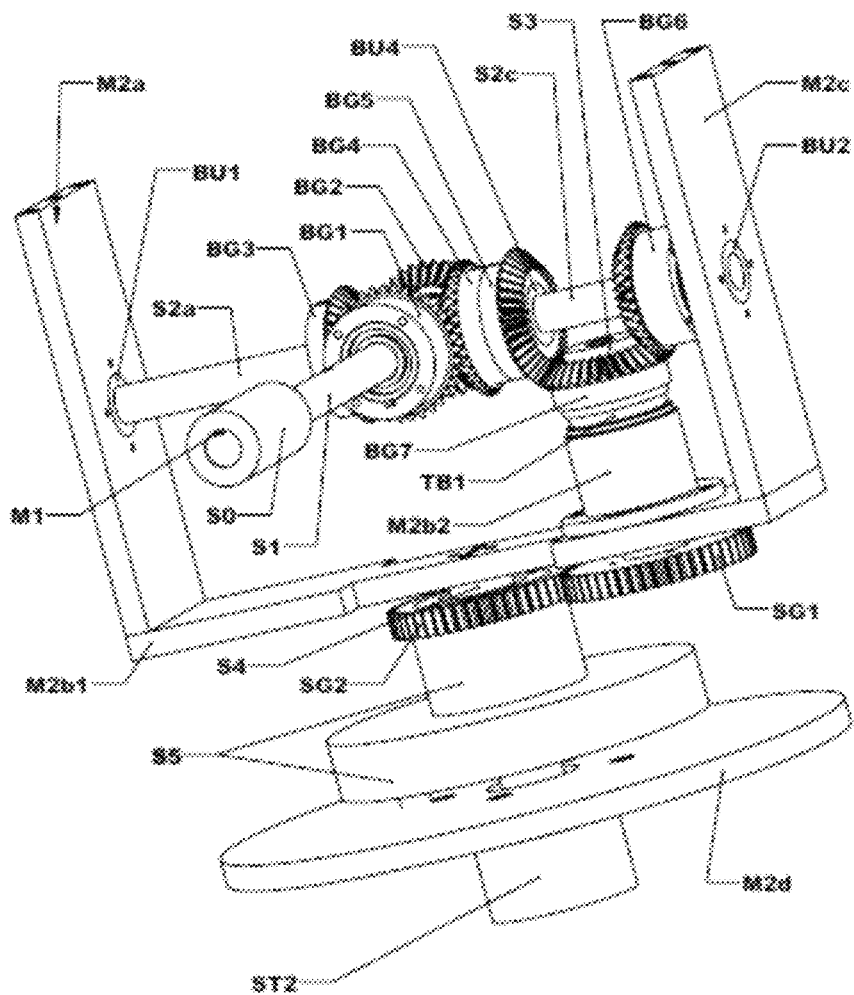
FIG. 6 illustrates a second perspective view of the energy harvesting device according to the principles of the present teachings.
Figure 7:
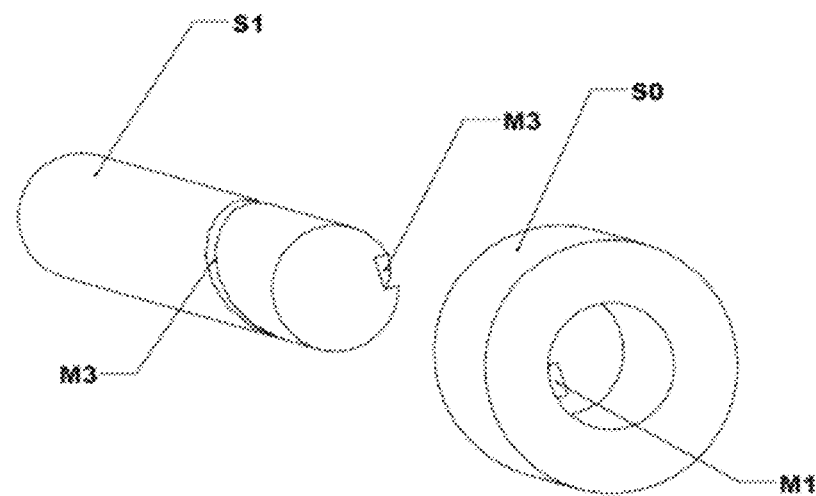
FIG. 7 illustrates an exploded view of the shafts S0 and S1 according to the principles of the present teachings.
Figure 8:
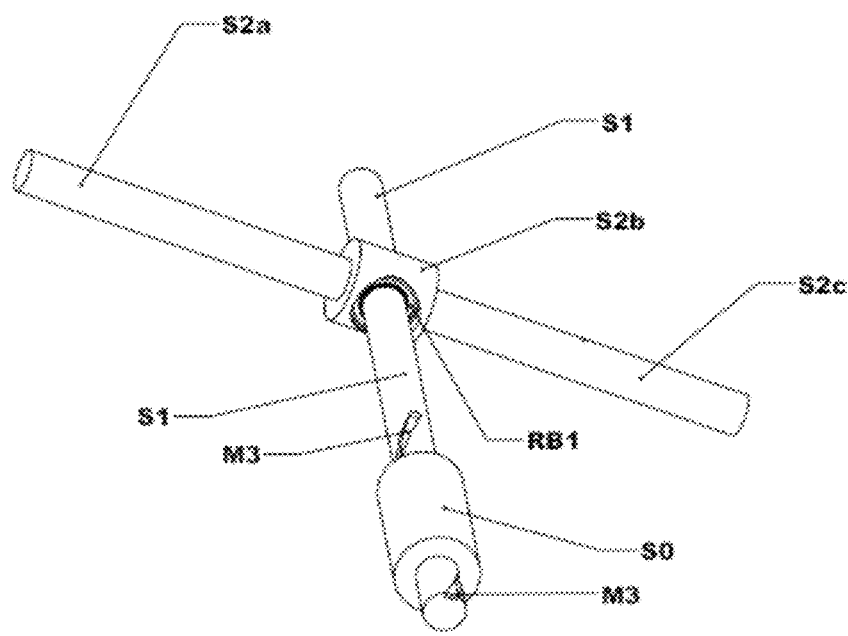
FIG. 8 illustrates the shafts S0, S1, S2a, S2b, S2c according to the principles of the present teachings.
Figure 9:
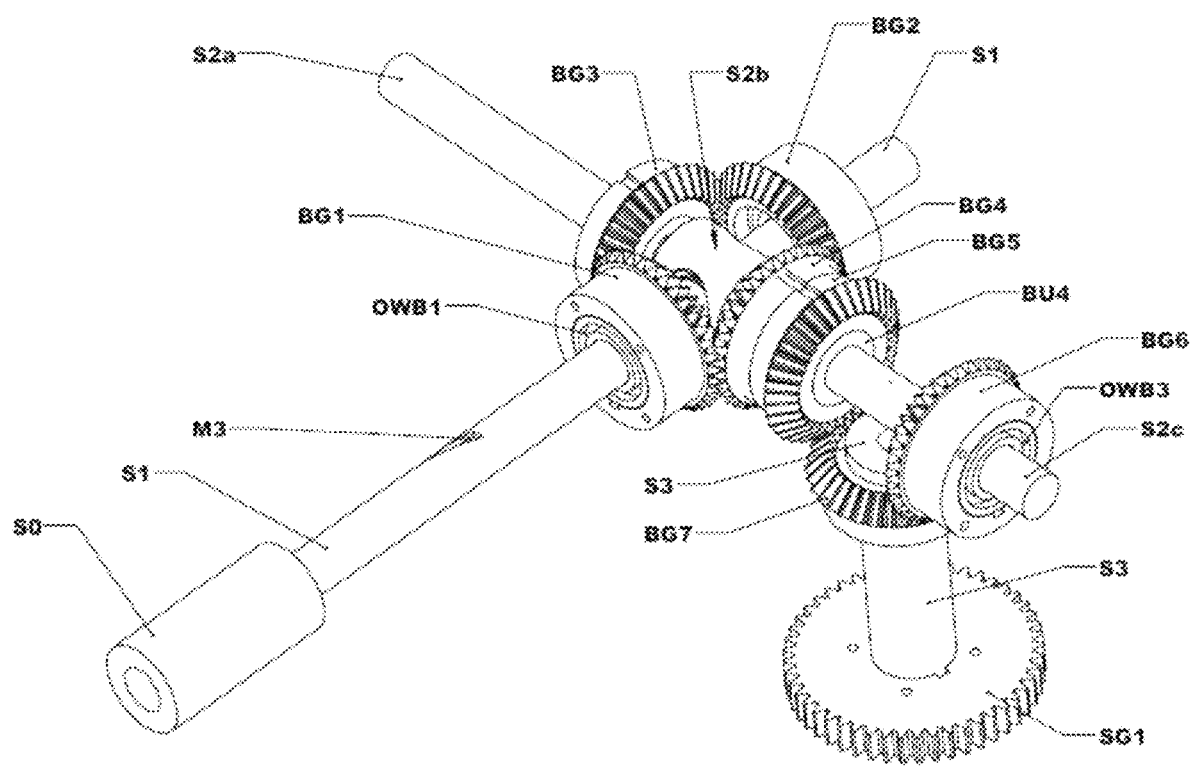
FIG. 9 illustrates a first perspective view of shafts S0, S1, S2a, S2b, S2c; bevel gears BG1, BG2, BG3, BG4, BG5, BG6, BG7; and spur gear SG1 according to the principles of the present teachings.
Figure 10:
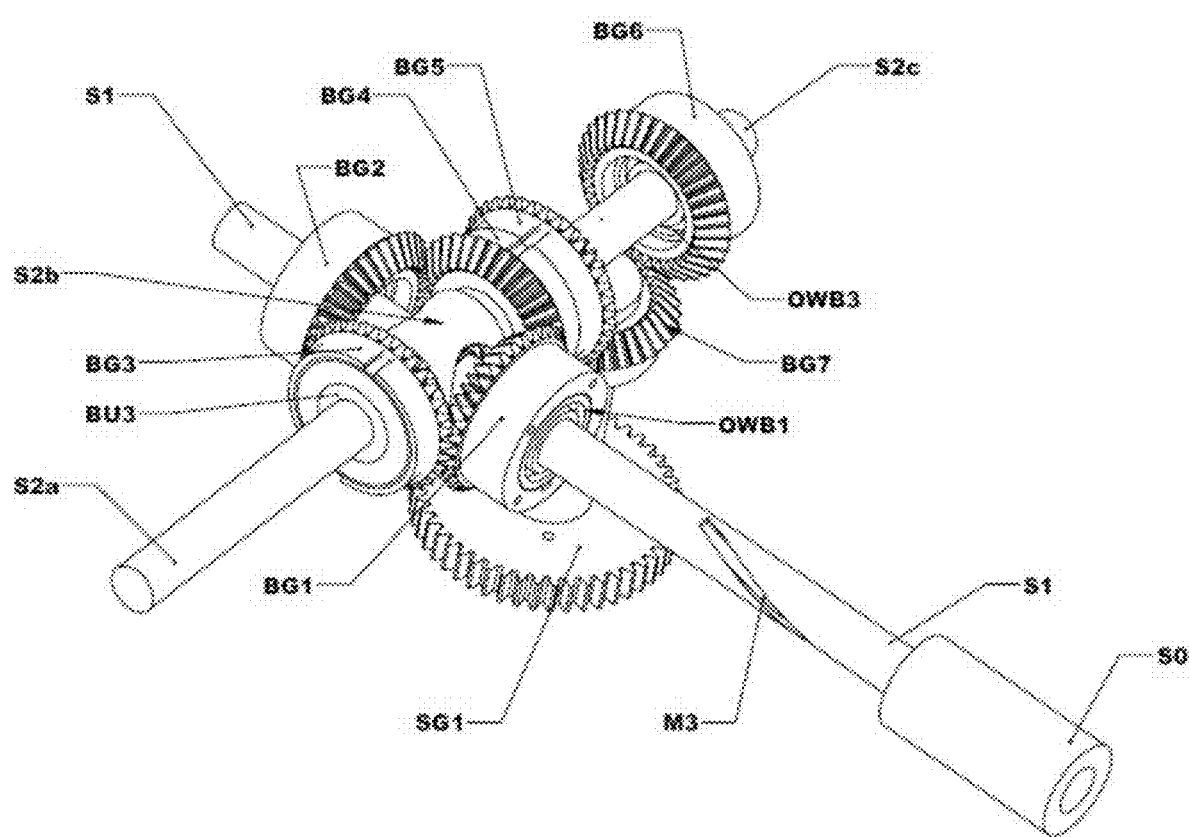
FIG. 10 illustrates a second perspective view of shafts S0, S1, S2a, S2b, S2c; bevel gears BG1, BG2, BG3, BG4, BG5, BG6, BG7; and spur gear SG1 according to the principles of the present teachings.
Figure 11:
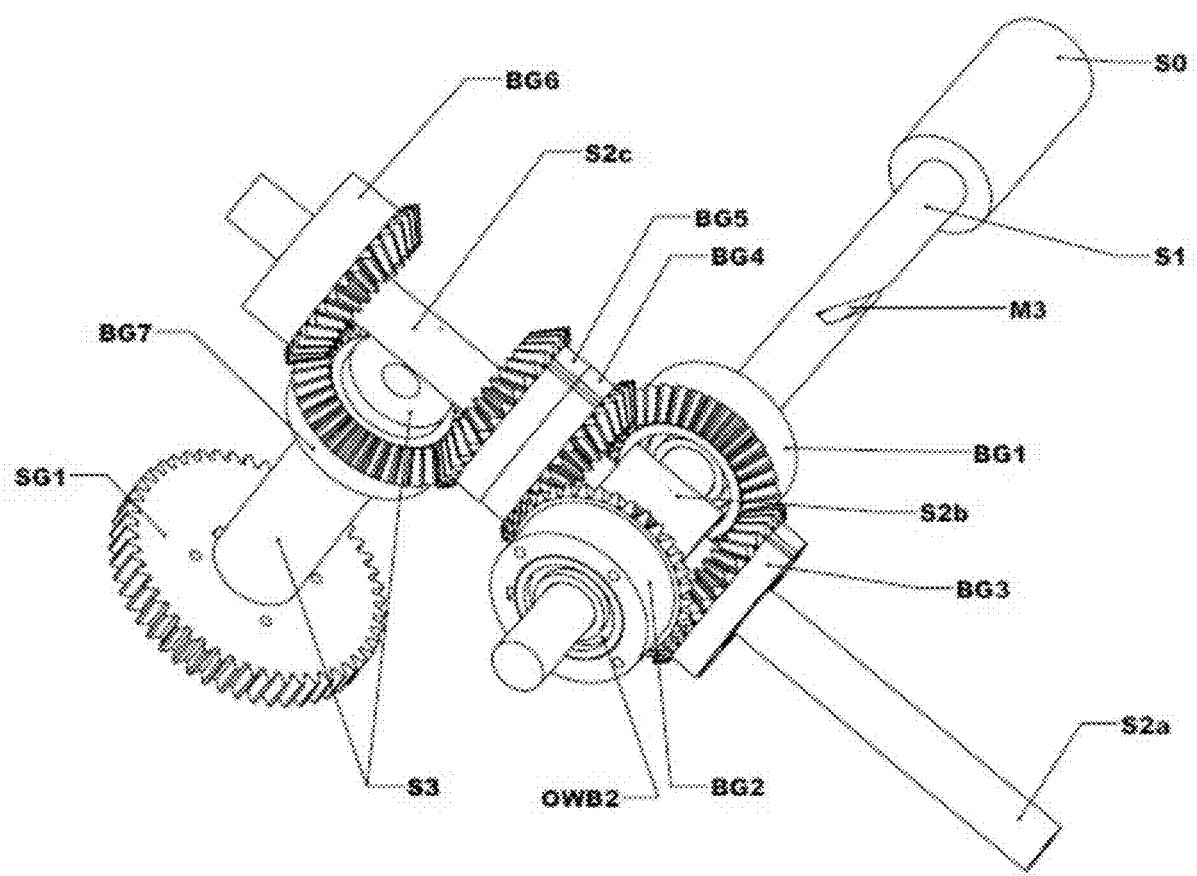
FIG. 11 illustrates a bottom perspective view of shafts S0, S1, S2a, S2b, S2c; bevel gears BG1, BG2, BG3, BG4, BG5, BG6, BG7; and spur gear SG1 according to the principles of the present teachings.
Figure 12:
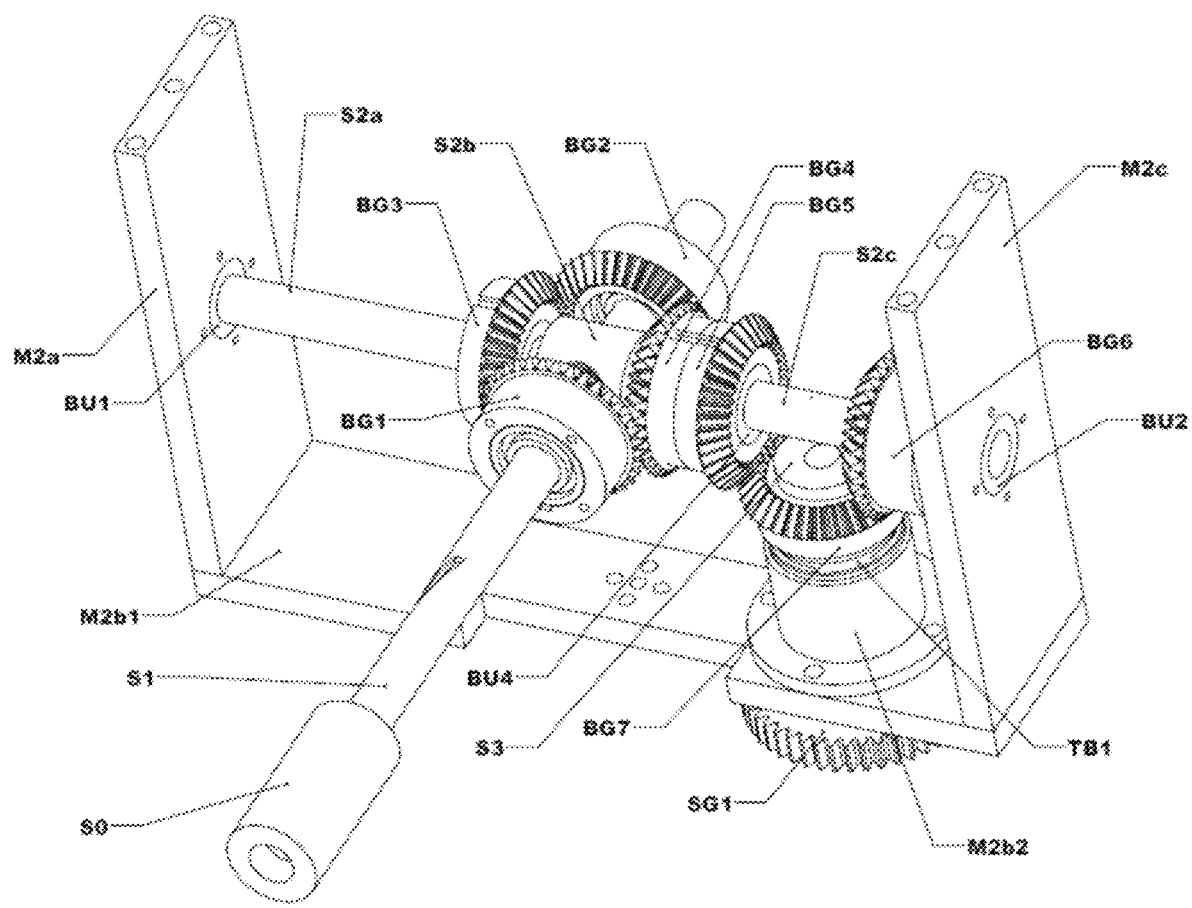
FIG. 12 illustrates a perspective view of an upper assembly according to the principles of the present teachings.
Figure 13:
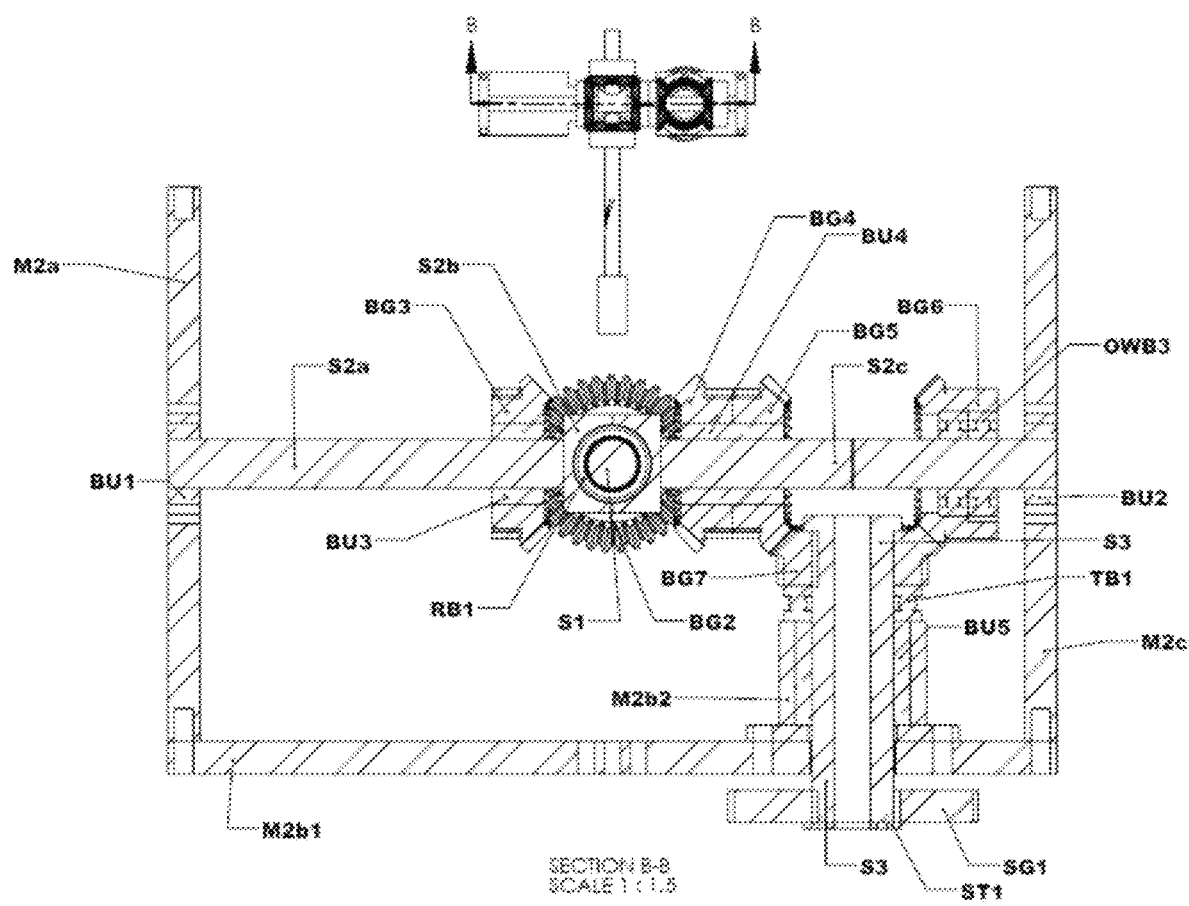
FIG. 13 illustrates a cross sectional view of the upper assembly according to the principles of the present teachings.
Figure 14:
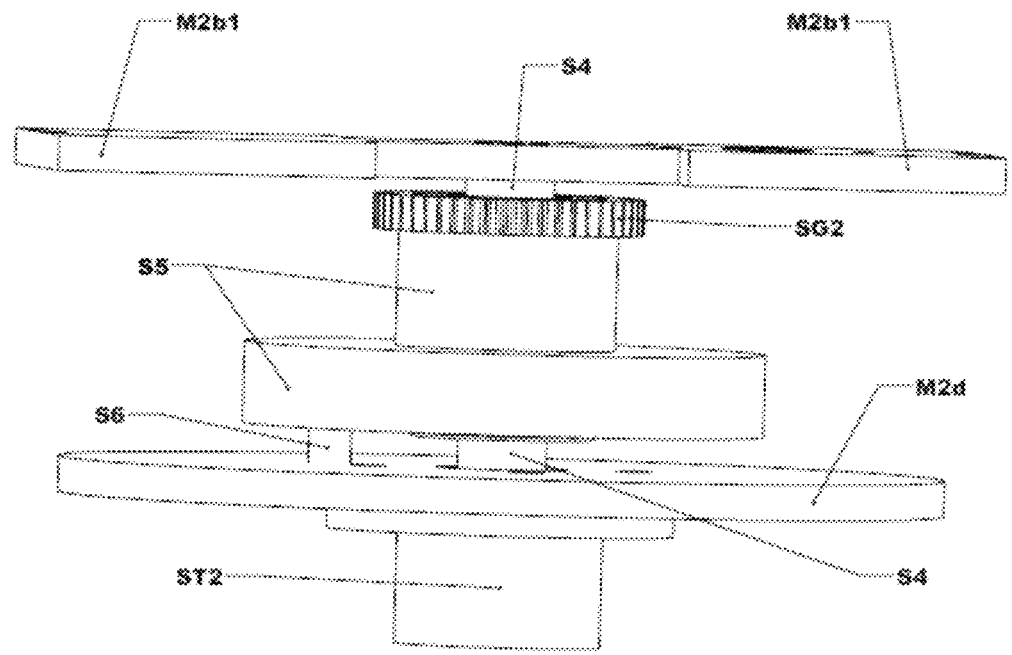
FIG. 14 illustrates a first perspective view of a lower assembly according to the principles of the present teachings.
Figure 15:
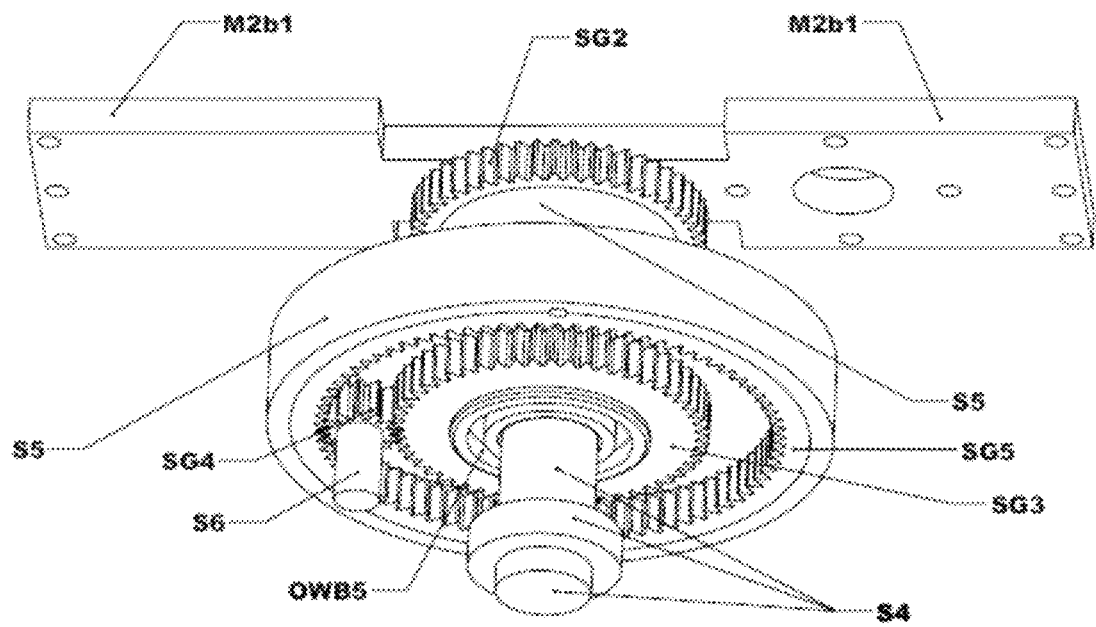
FIG. 15 illustrates a second perspective view of the lower assembly according to the principles of the present teachings.
Figure 16:
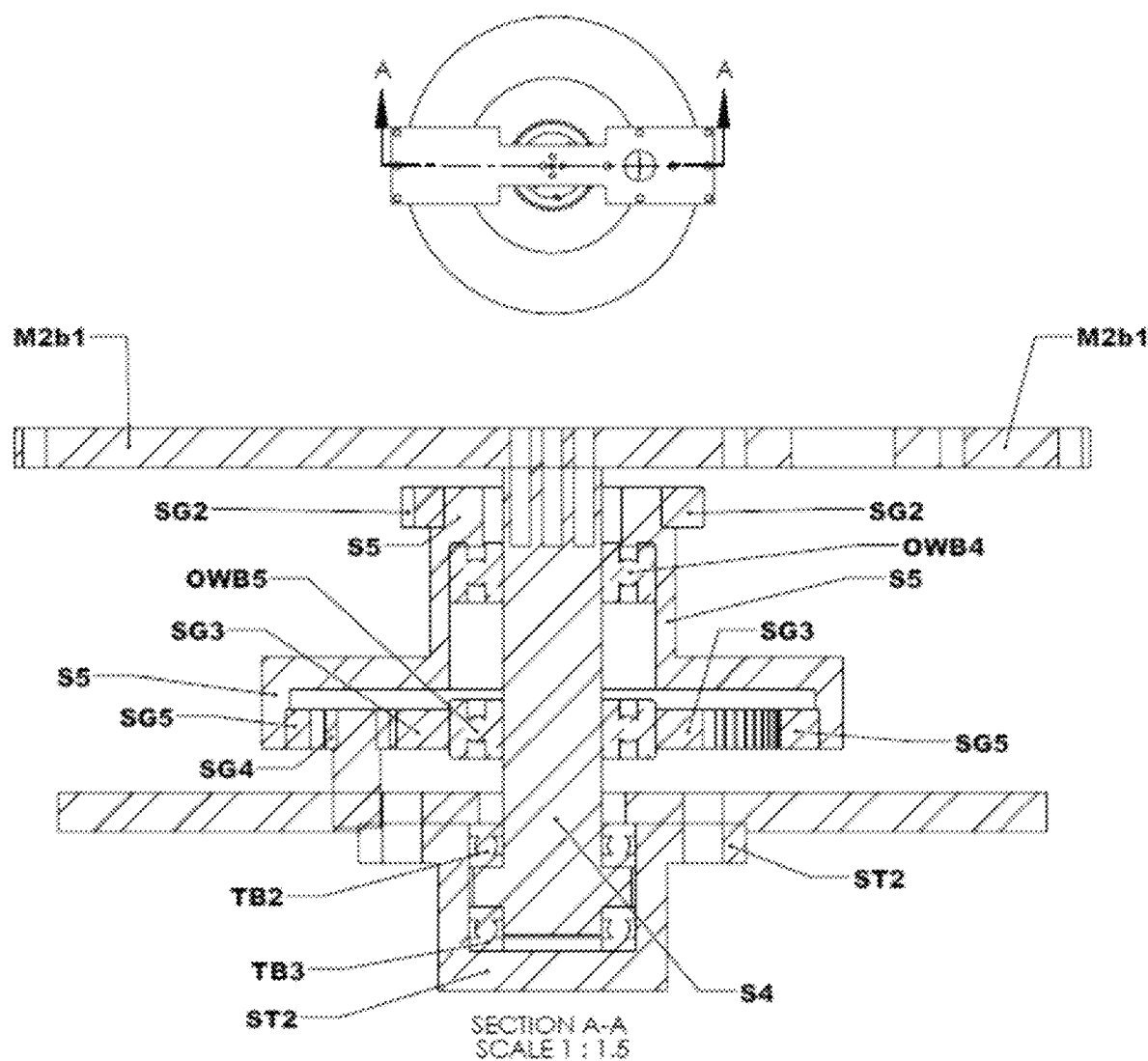
FIG. 16 illustrates a cross sectional view of the lower assembly according to the principles of the present teachings.
Figure 17:
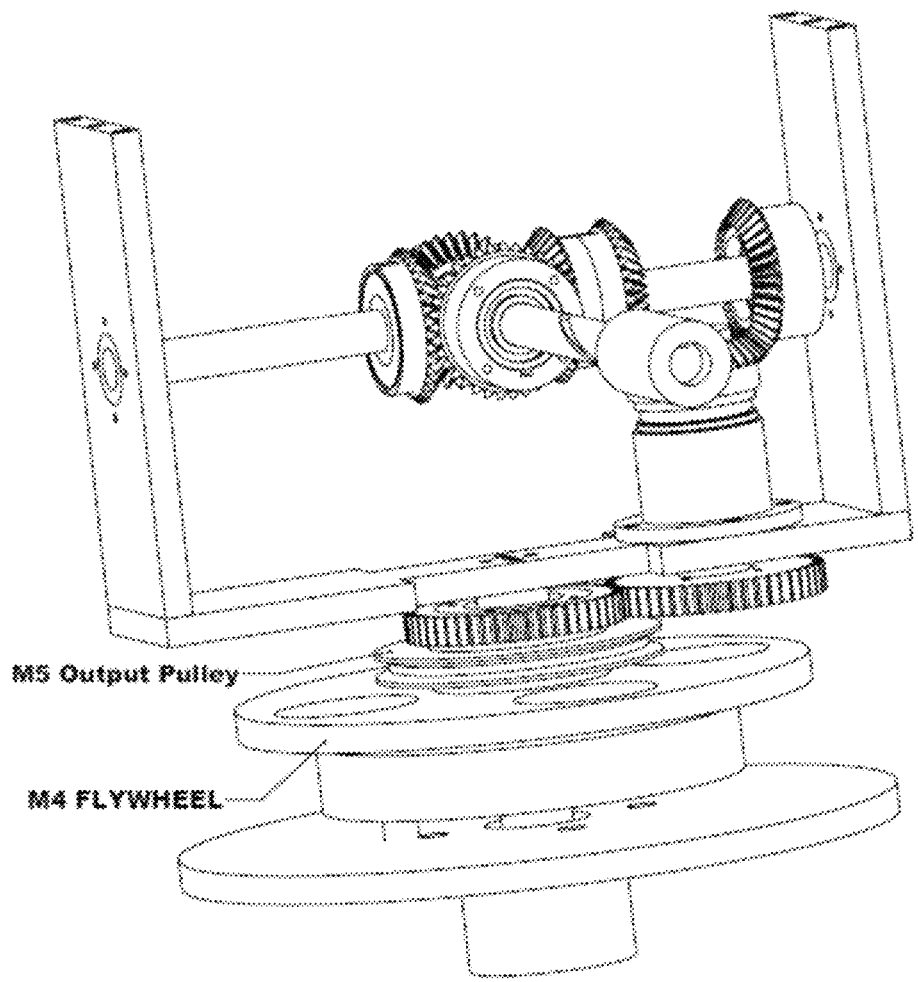
FIG. 17 illustrates a perspective view of the energy harvesting device with a flywheel and pulley according to the principles of the present teachings.
Figure 18:
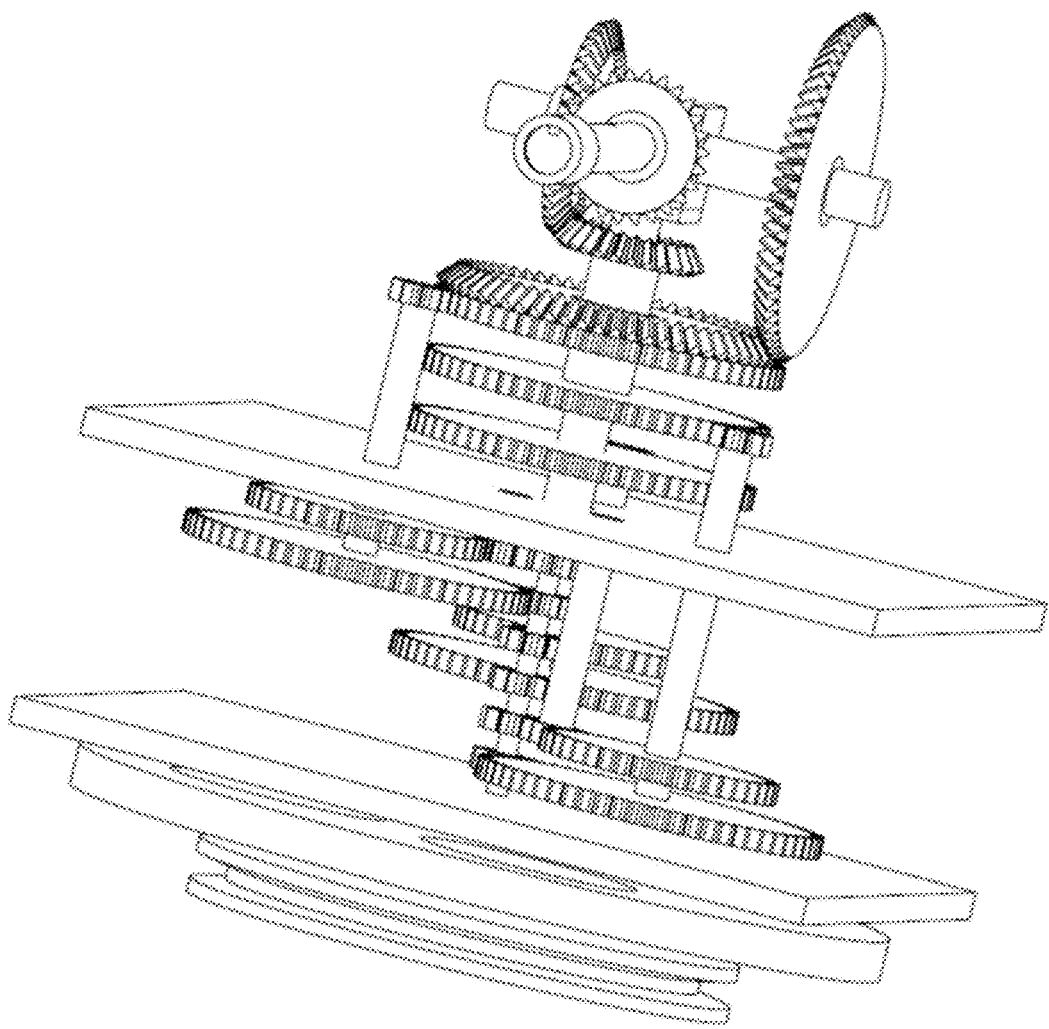
FIG. 18 illustrates a perspective view of the energy harvesting device according to the principles of the present teachings.
Figure 19:
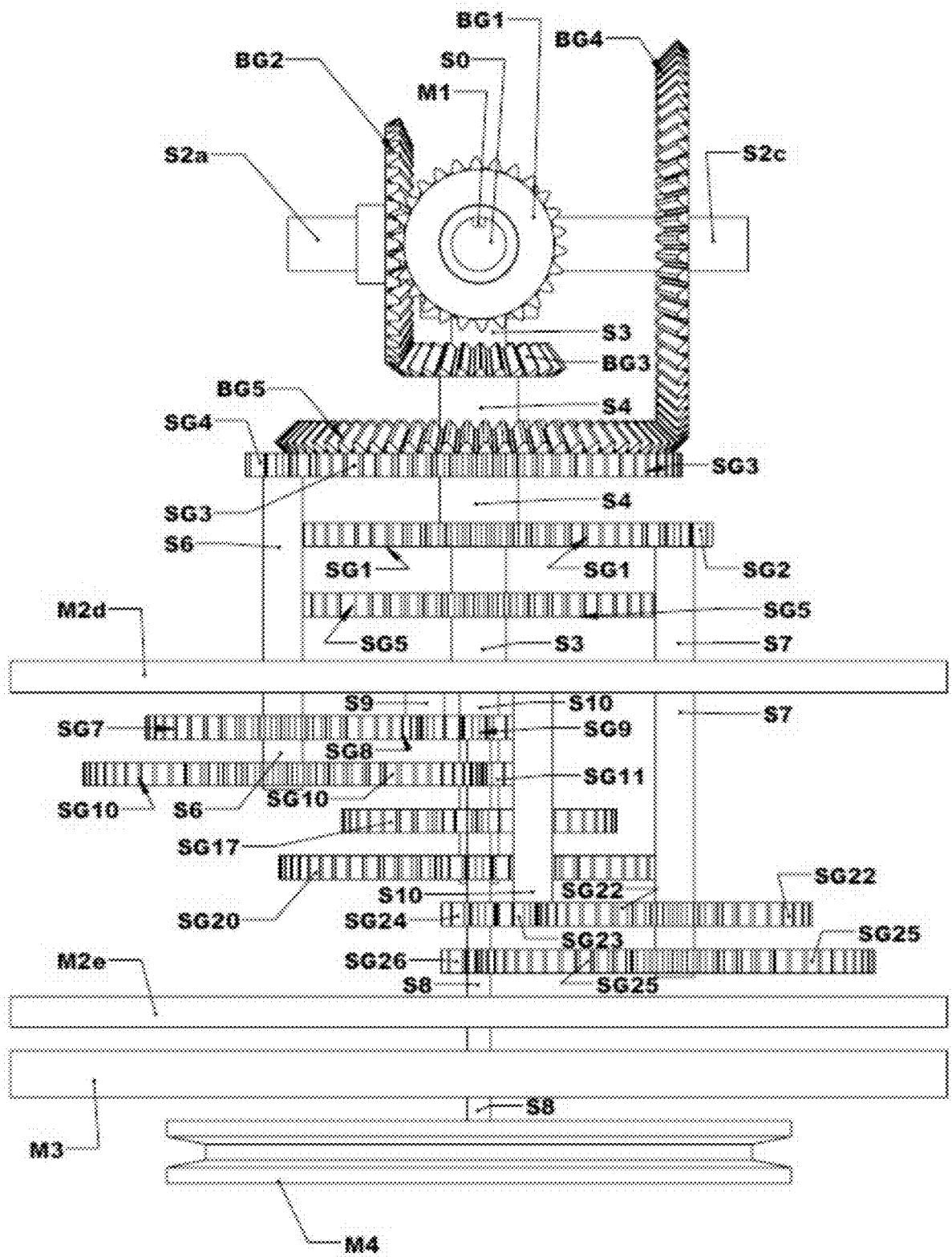
FIG. 19 illustrates a front view of the energy harvesting device according to the principles of the present teachings.
Figure 20:
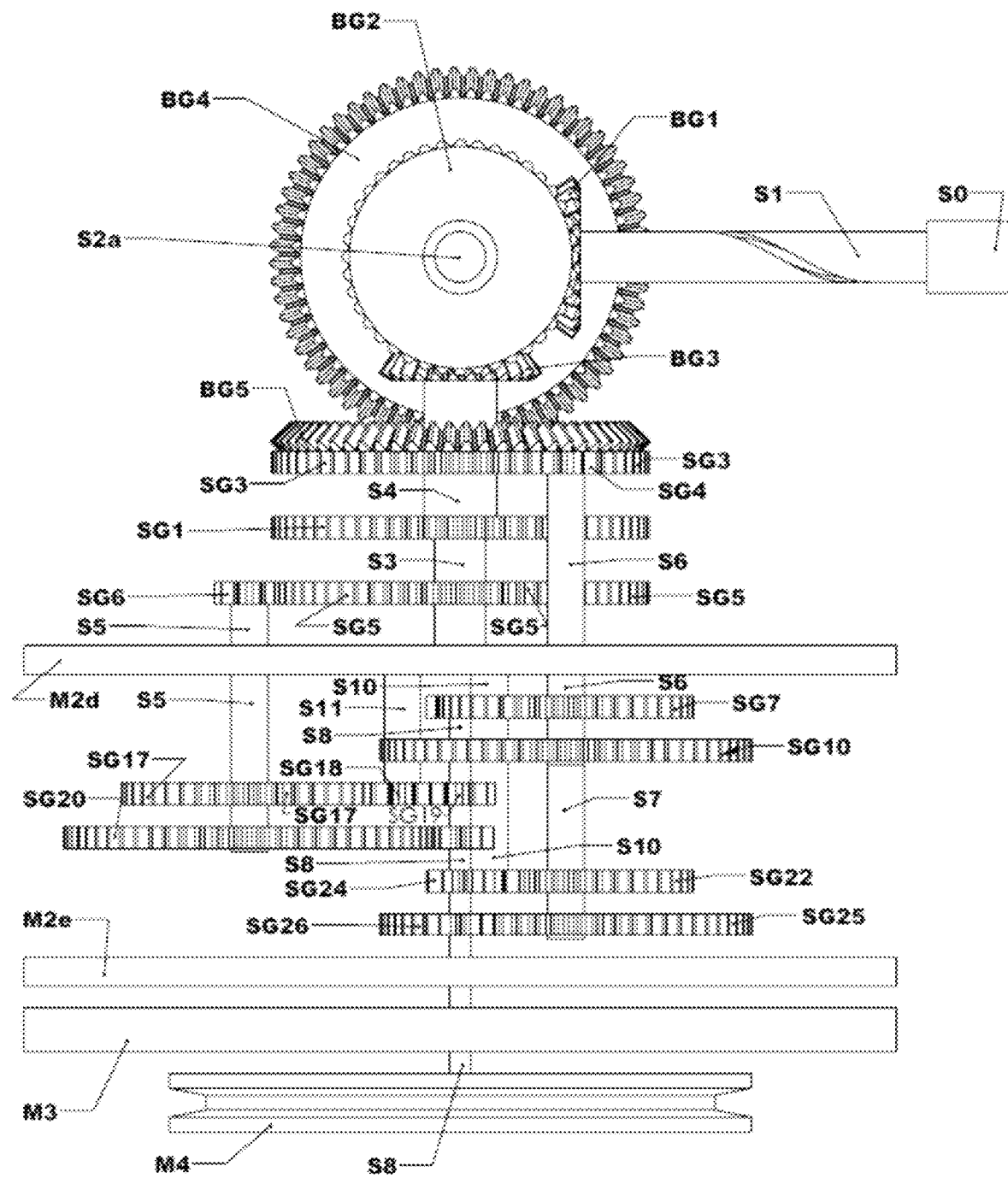
FIG. 20 illustrates a left side view of the energy harvesting device according to the principles of the present teachings.
Figure 21:
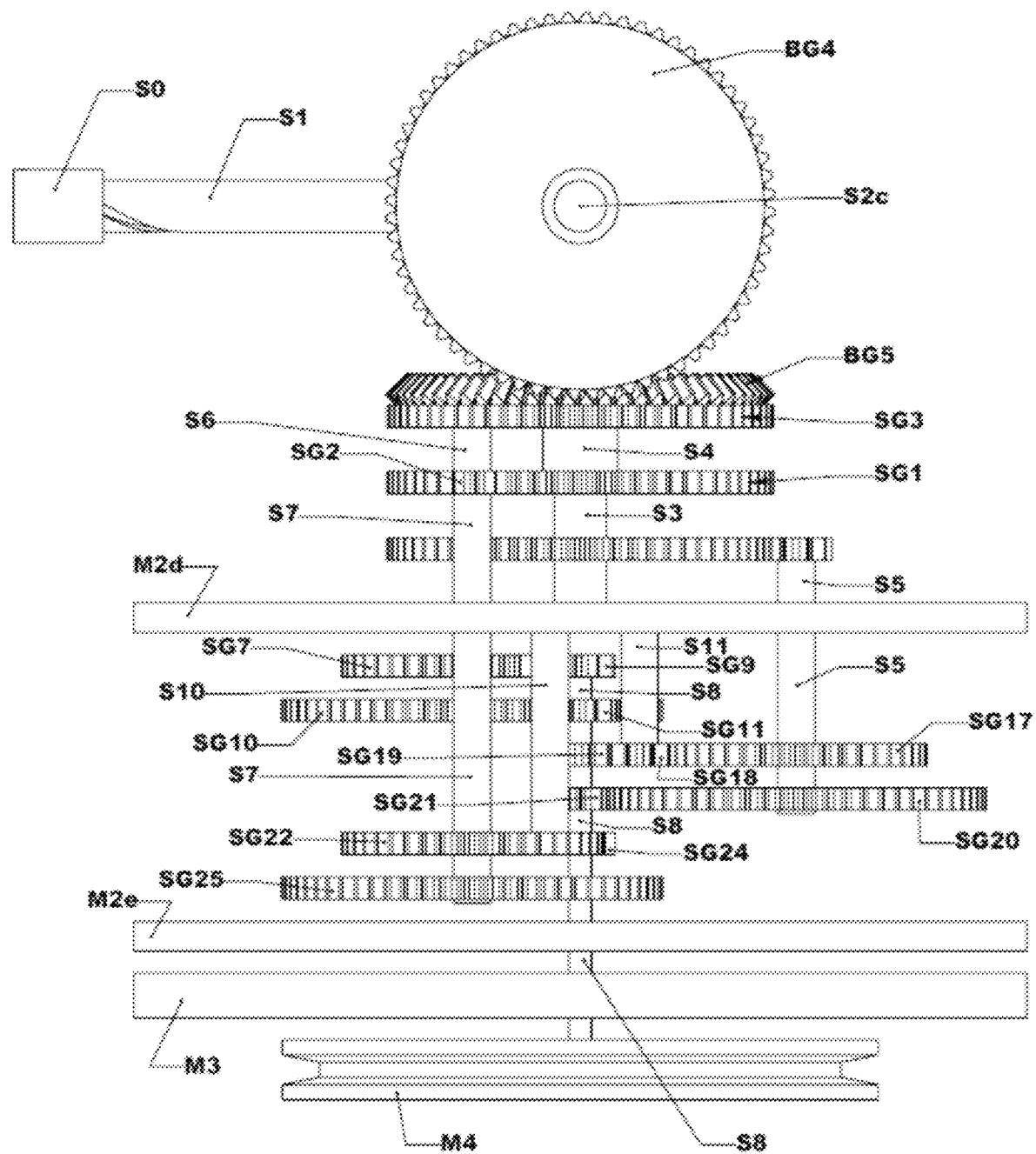
FIG. 21 illustrates a right side view of the energy harvesting device according to the principles of the present teachings.
Figure 22:
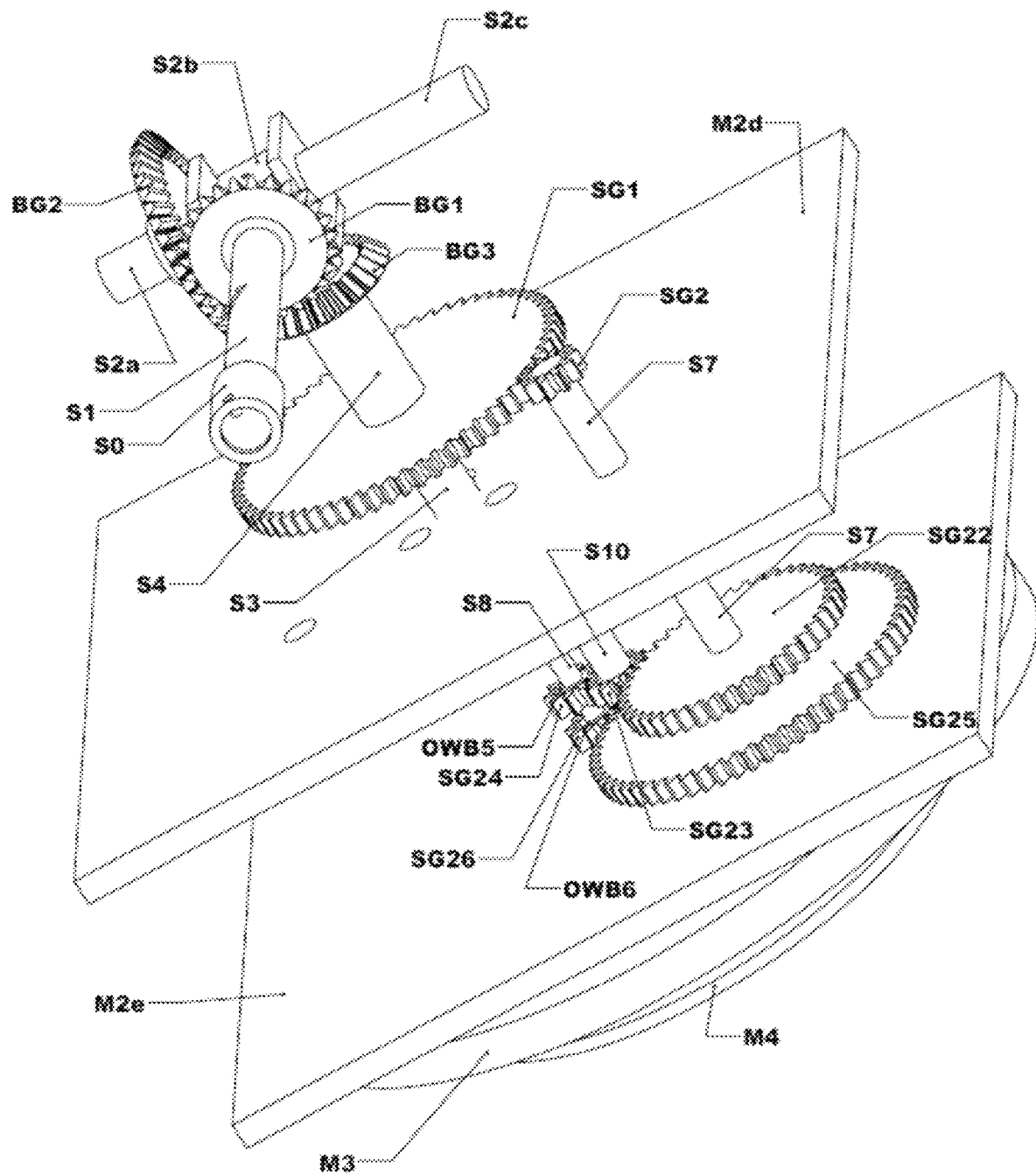
FIG. 22 illustrates a perspective view of the roll and surge gear train according to the principles of the present teachings with portions removed for clarity.
Figure 23:
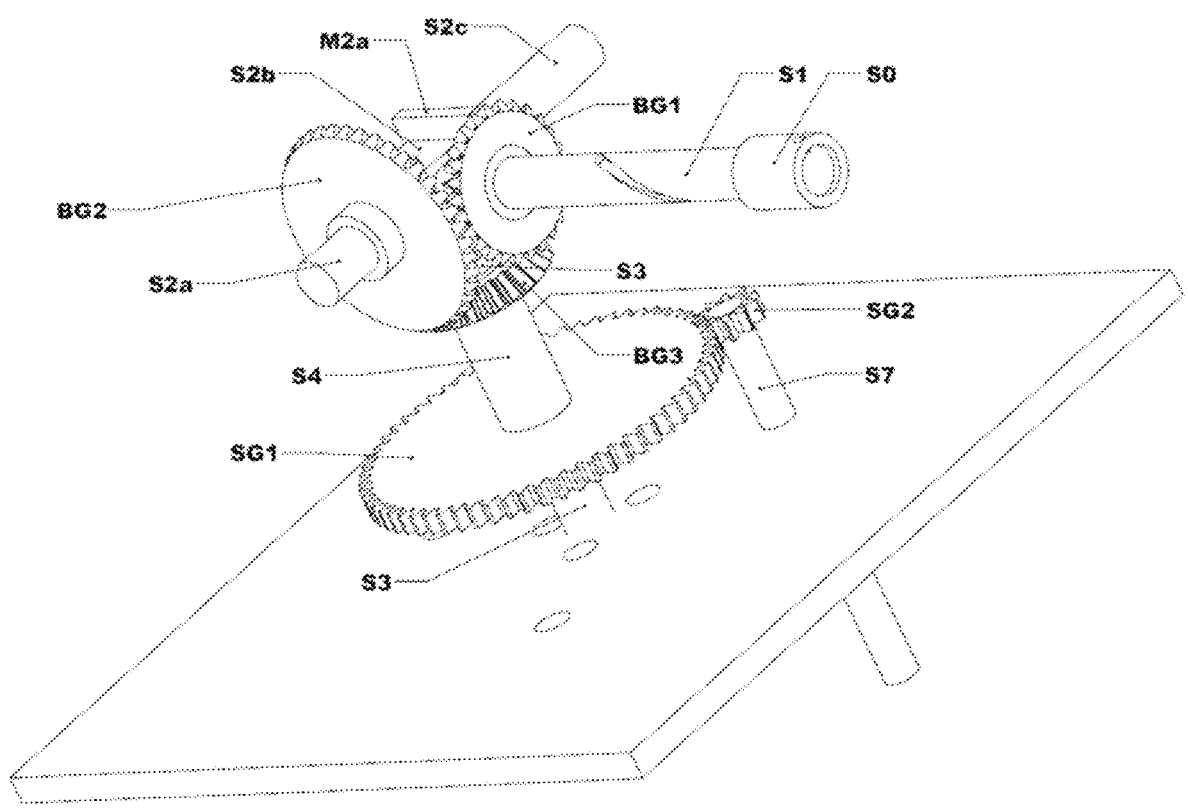
FIG. 23 illustrates a perspective view of the roll and surge gear train according to the principles of the present teachings with portions removed for clarity.
Figure 24:
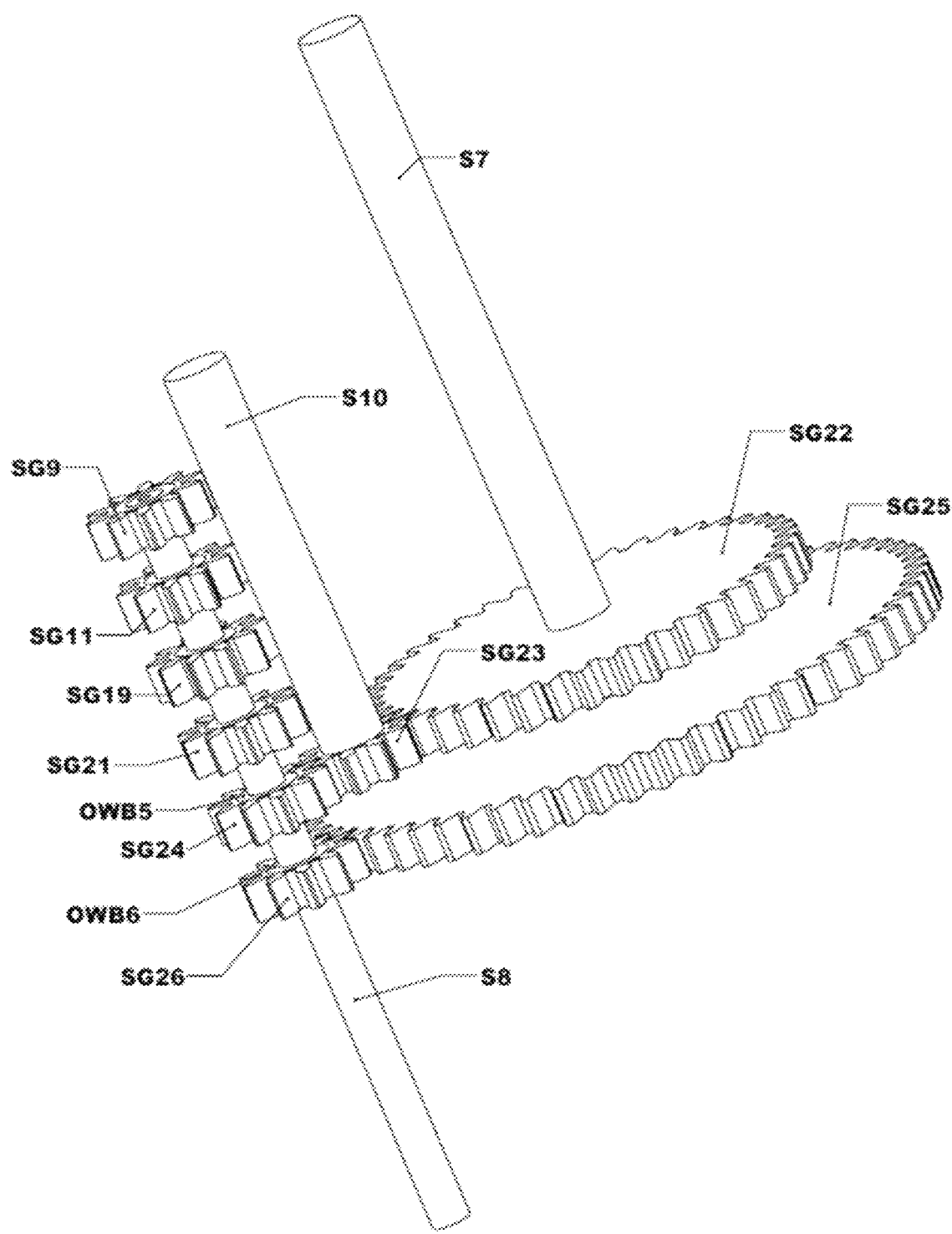
FIG. 24 illustrates a perspective view of the roll and surge gear train according to the principles of the present teachings with portions removed for clarity.
Figure 25:
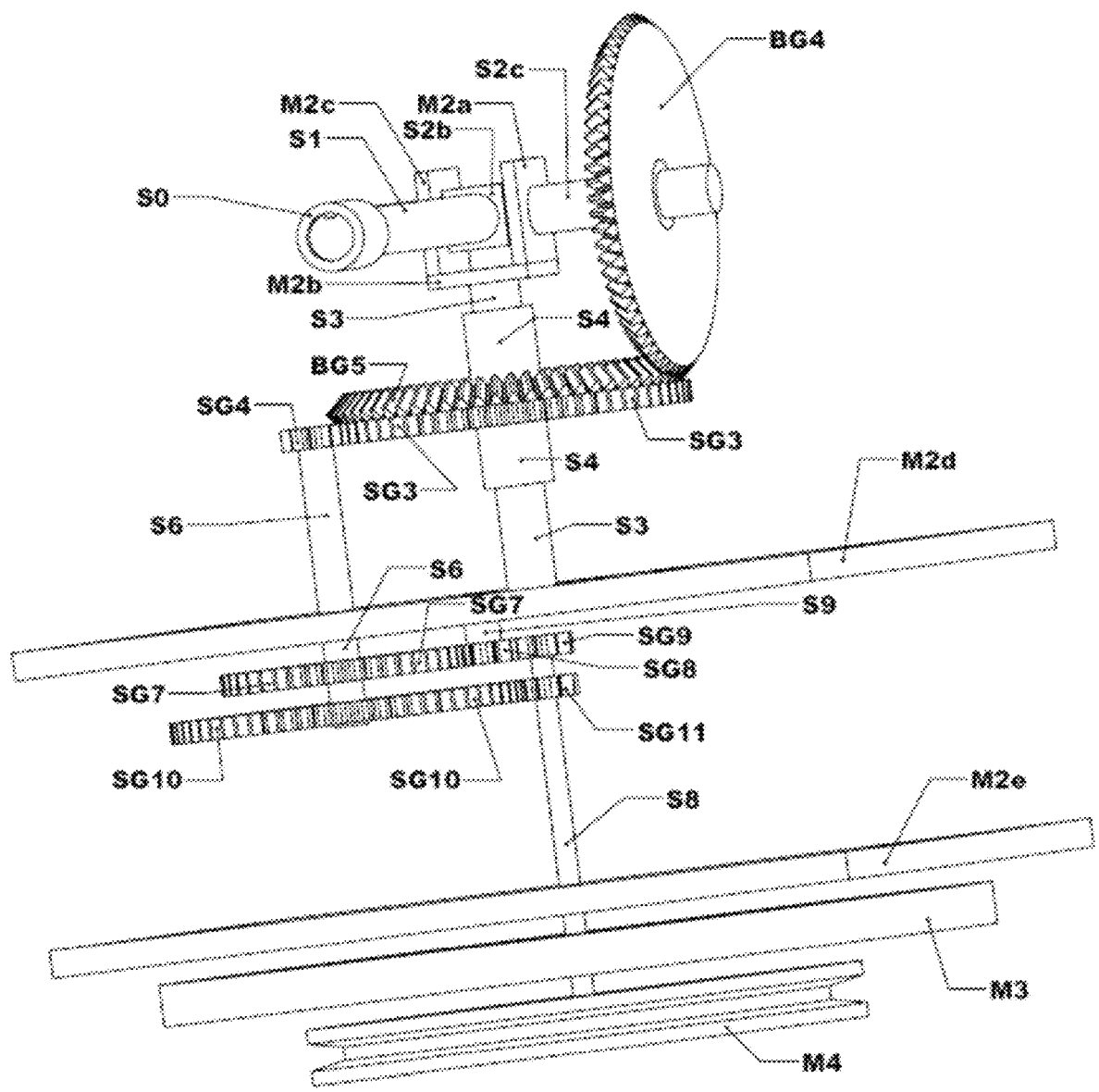
FIG. 25 illustrates a perspective view of the pitch and heave gear train according to the principles of the present teachings with portions removed for clarity.
Figure 26:
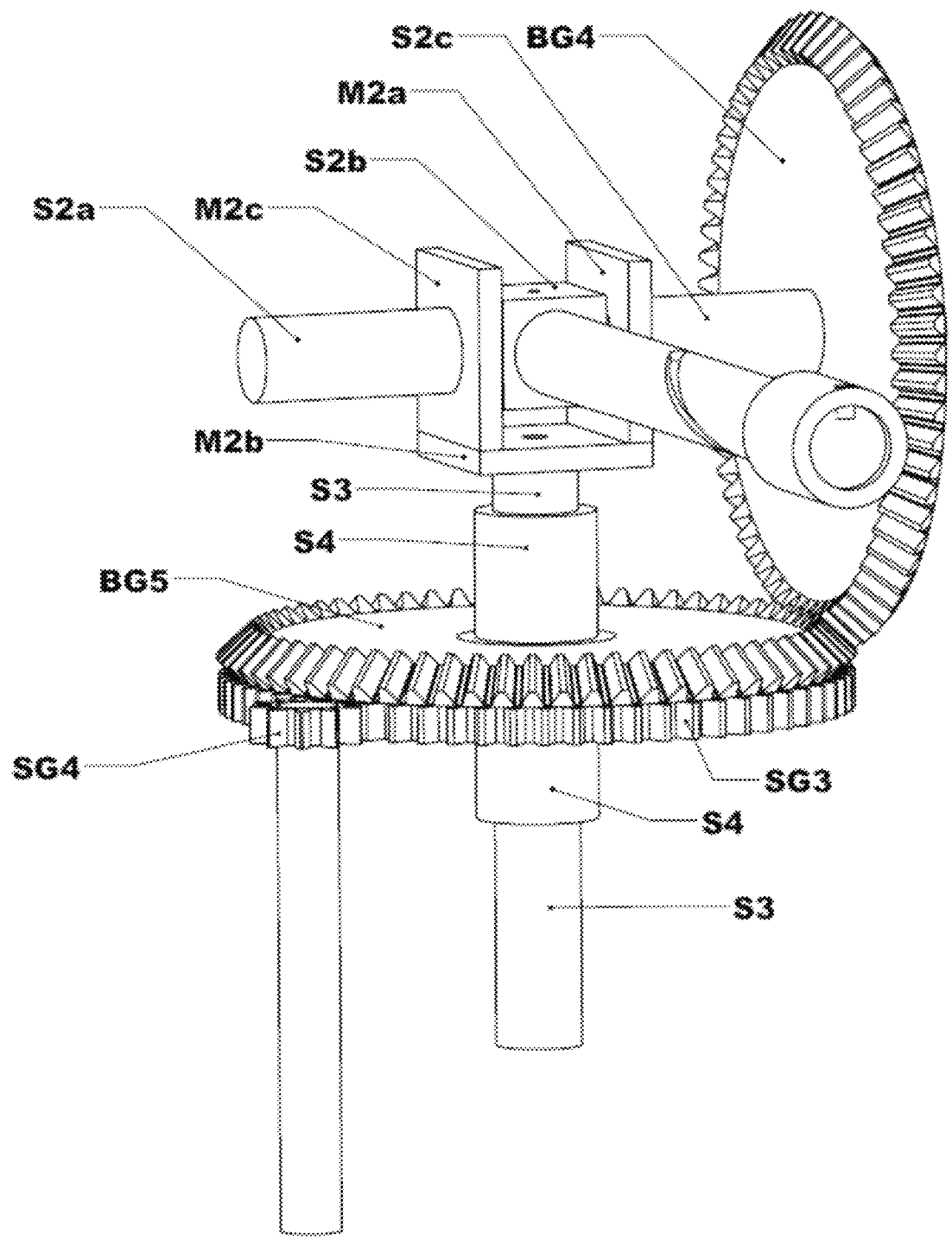
FIG. 26 illustrates a perspective view of the pitch and heave gear train according to the principles of the present teachings with portions removed for clarity.
Figure 27:
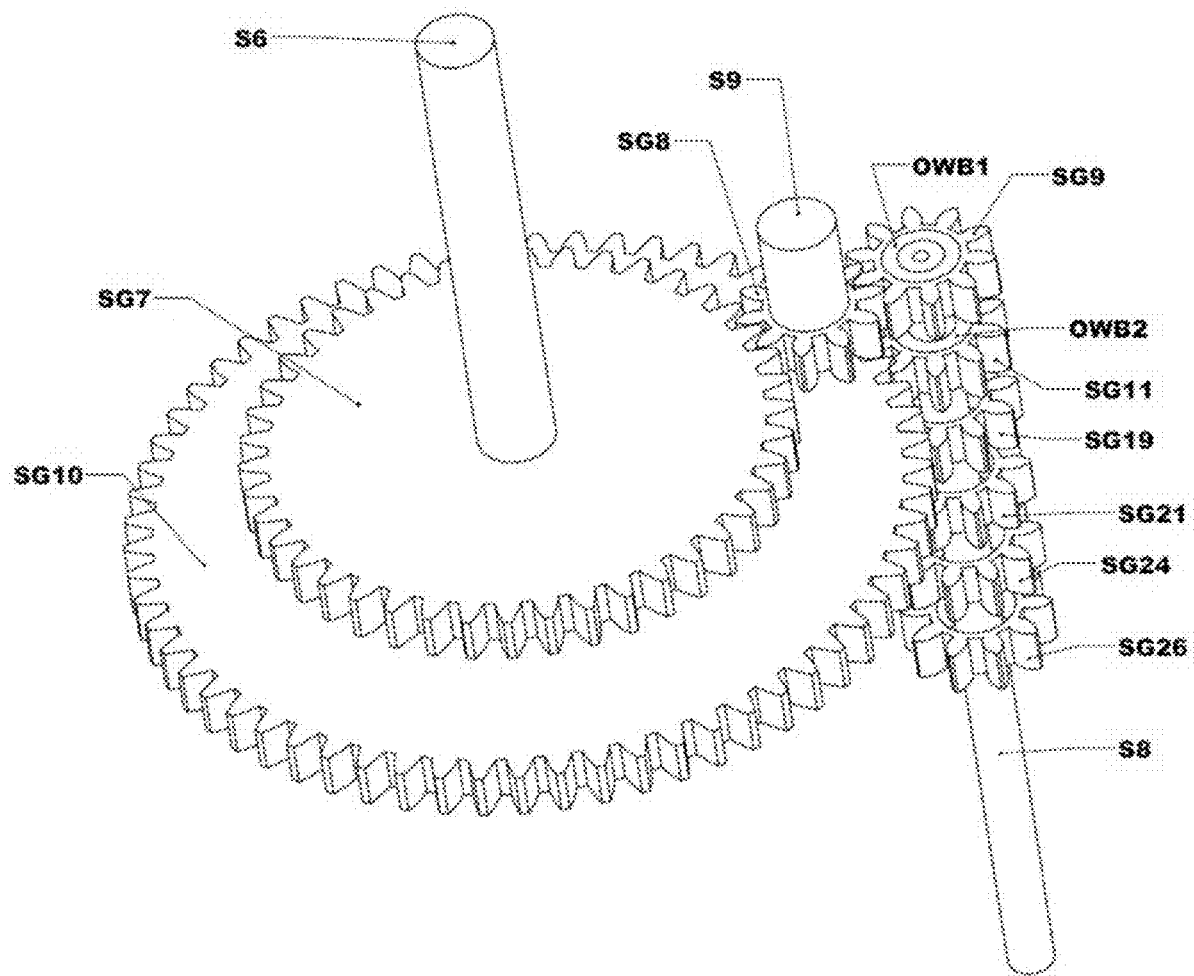
FIG. 27 illustrates a perspective view of the pitch and heave gear train according to the principles of the present teachings with portions removed for clarity.
Figure 28:
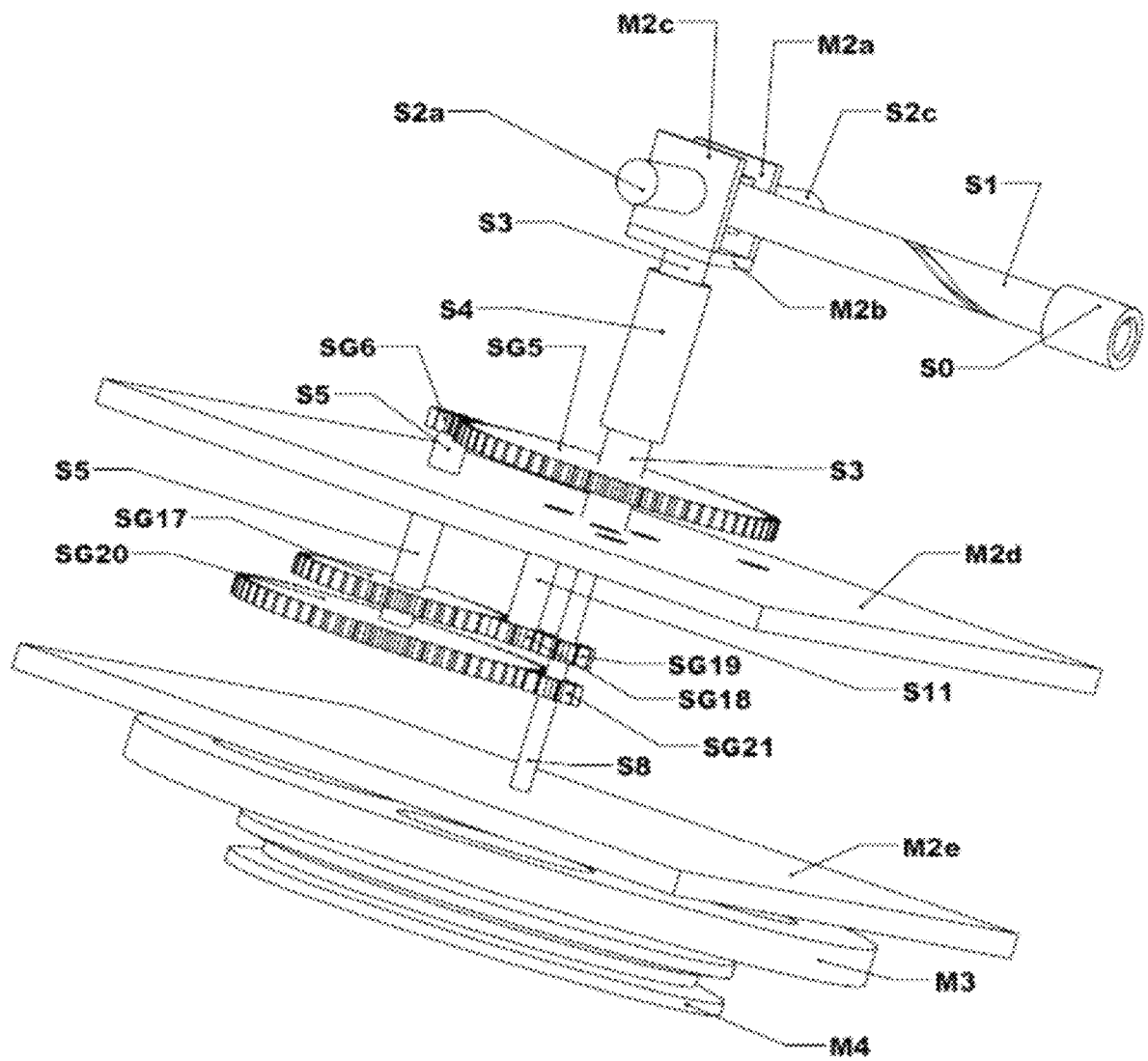
FIG. 28 illustrates a perspective view of the sway and yaw gear train according to the principles of the present teachings with portions removed for clarity.
Figure 29:
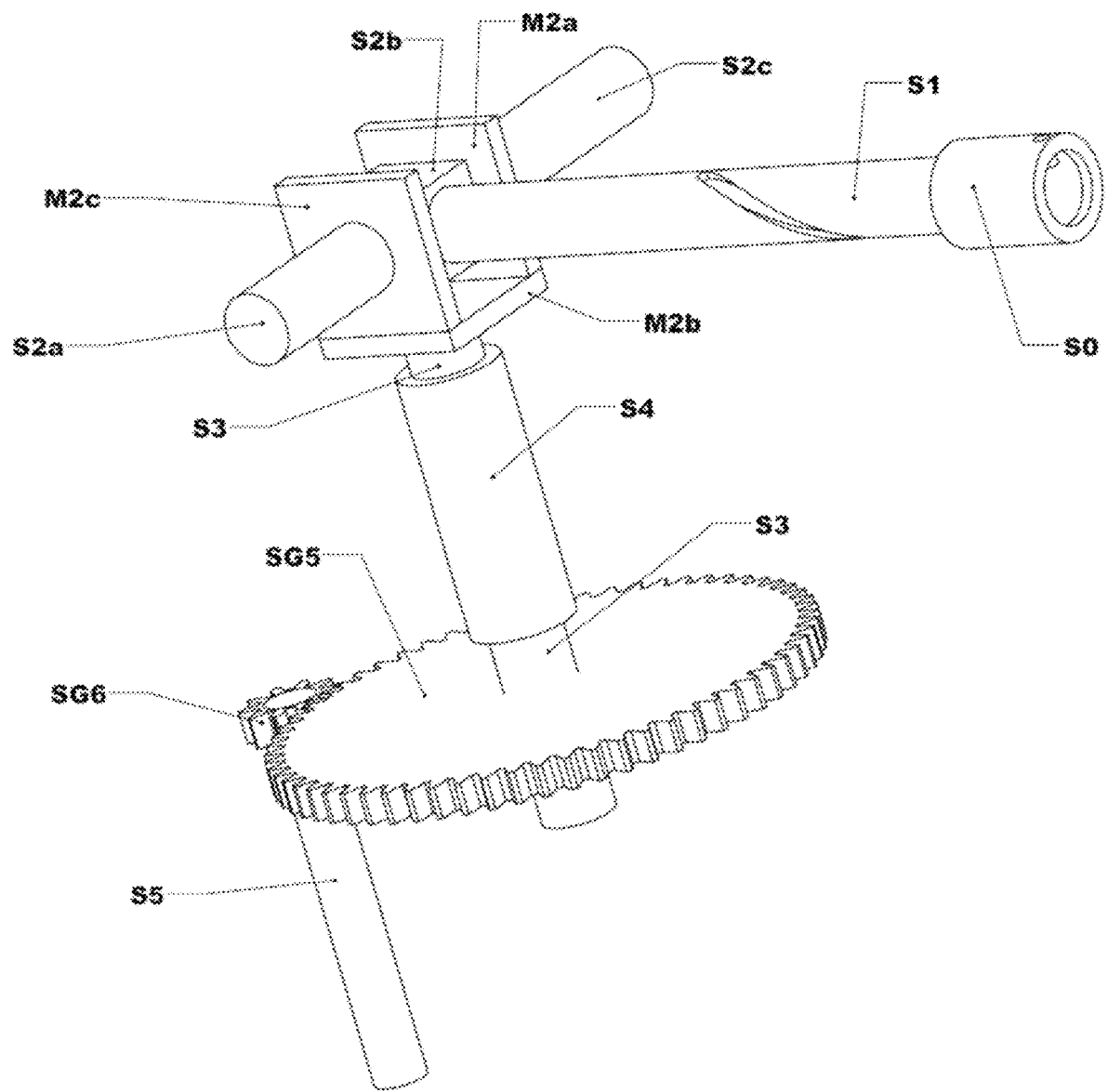
FIG. 29 illustrates a perspective view of the sway and yaw gear train according to the principles of the present teachings with portions removed for clarity.
Figure 30:
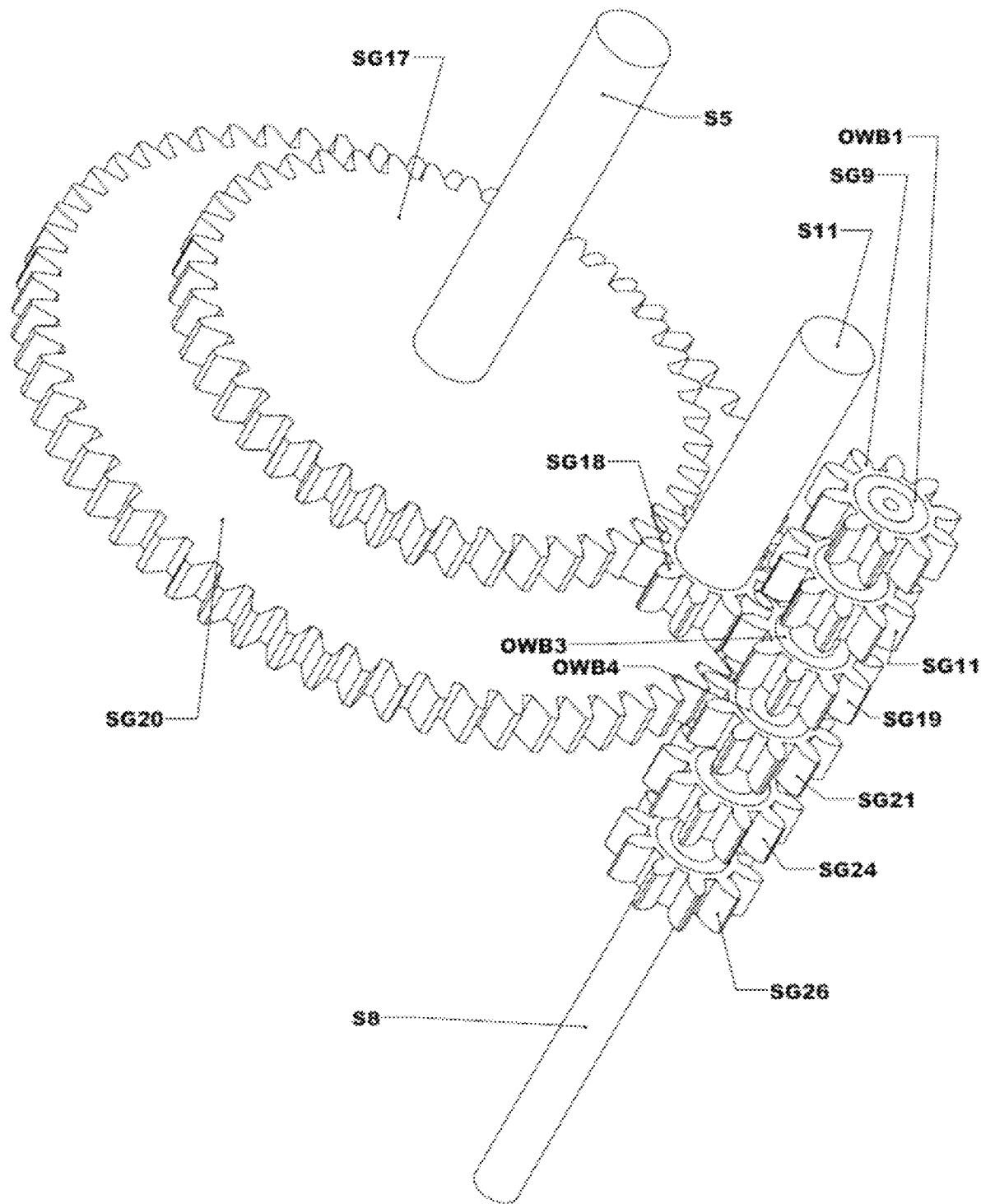
FIG. 30 illustrates a perspective view of the sway and yaw gear train according to the principles of the present teachings with portions removed for clarity.
Figure 31:
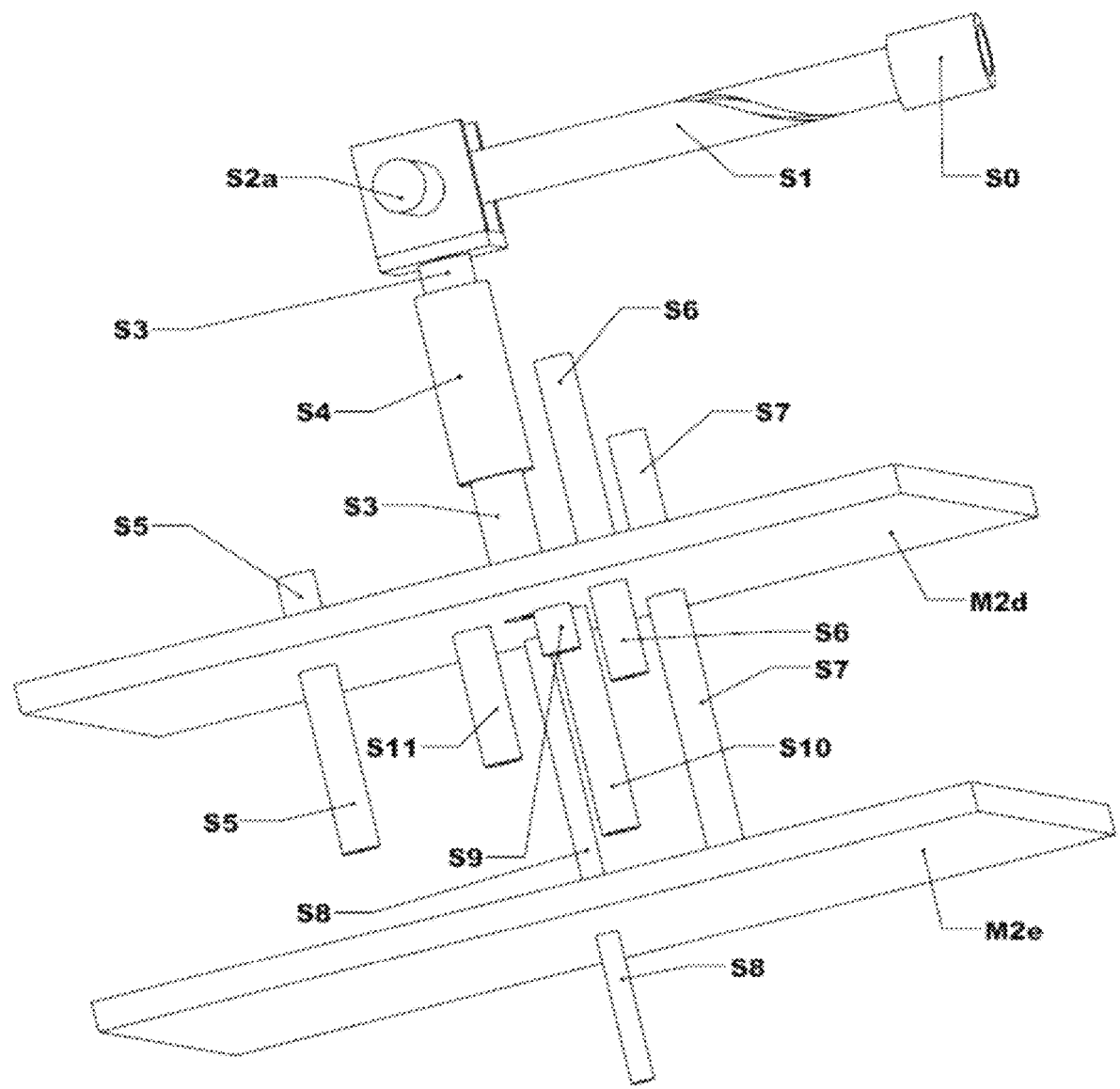
FIG. 31 illustrates a perspective view of the shafts according to the principles of the present teachings with portions removed for clarity.
Figure 32:
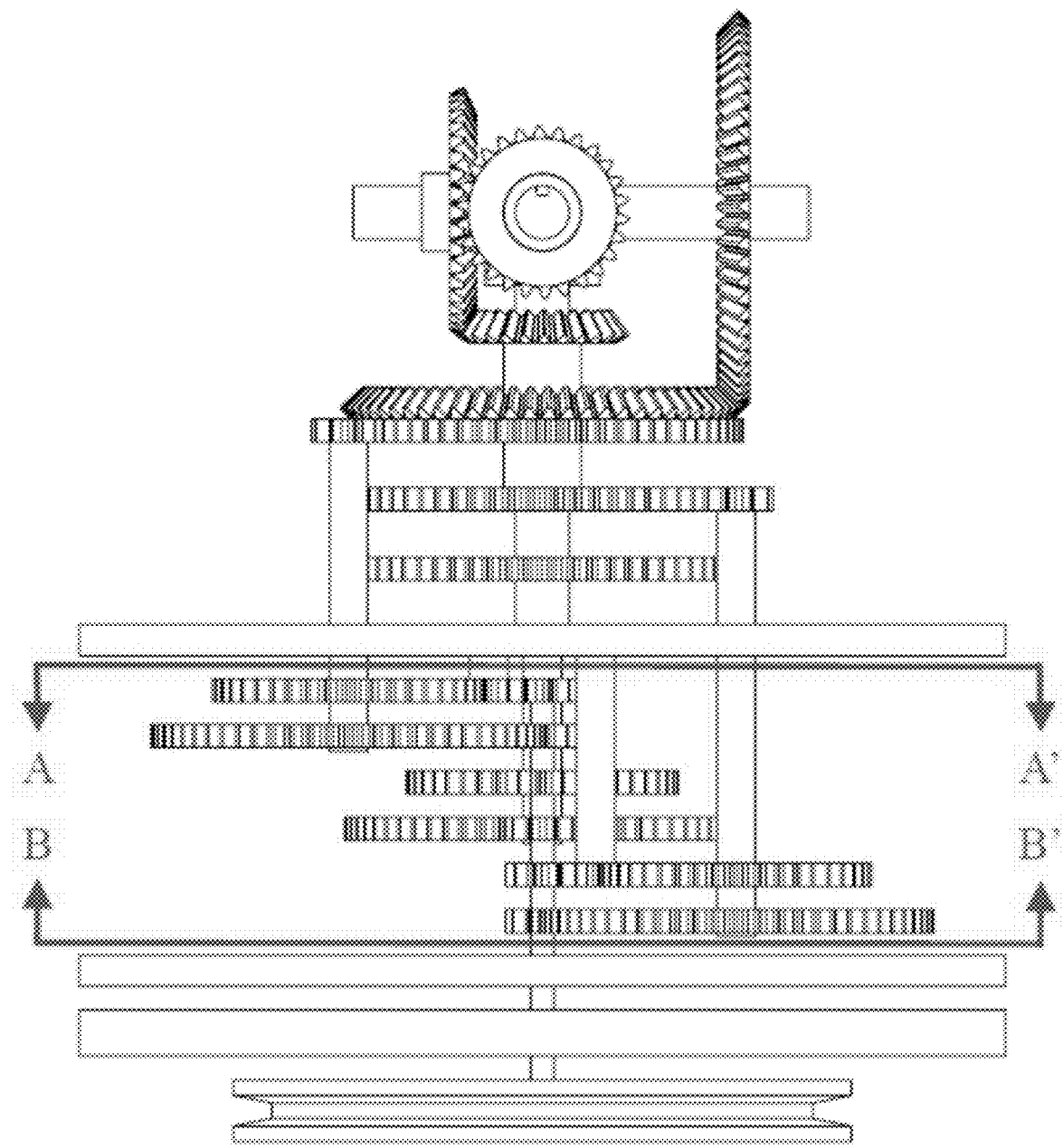
FIG. 32 illustrates a side view of the gears between the middle and lower housing according to the principles of the present teachings with portions removed for clarity.
Figure 33:
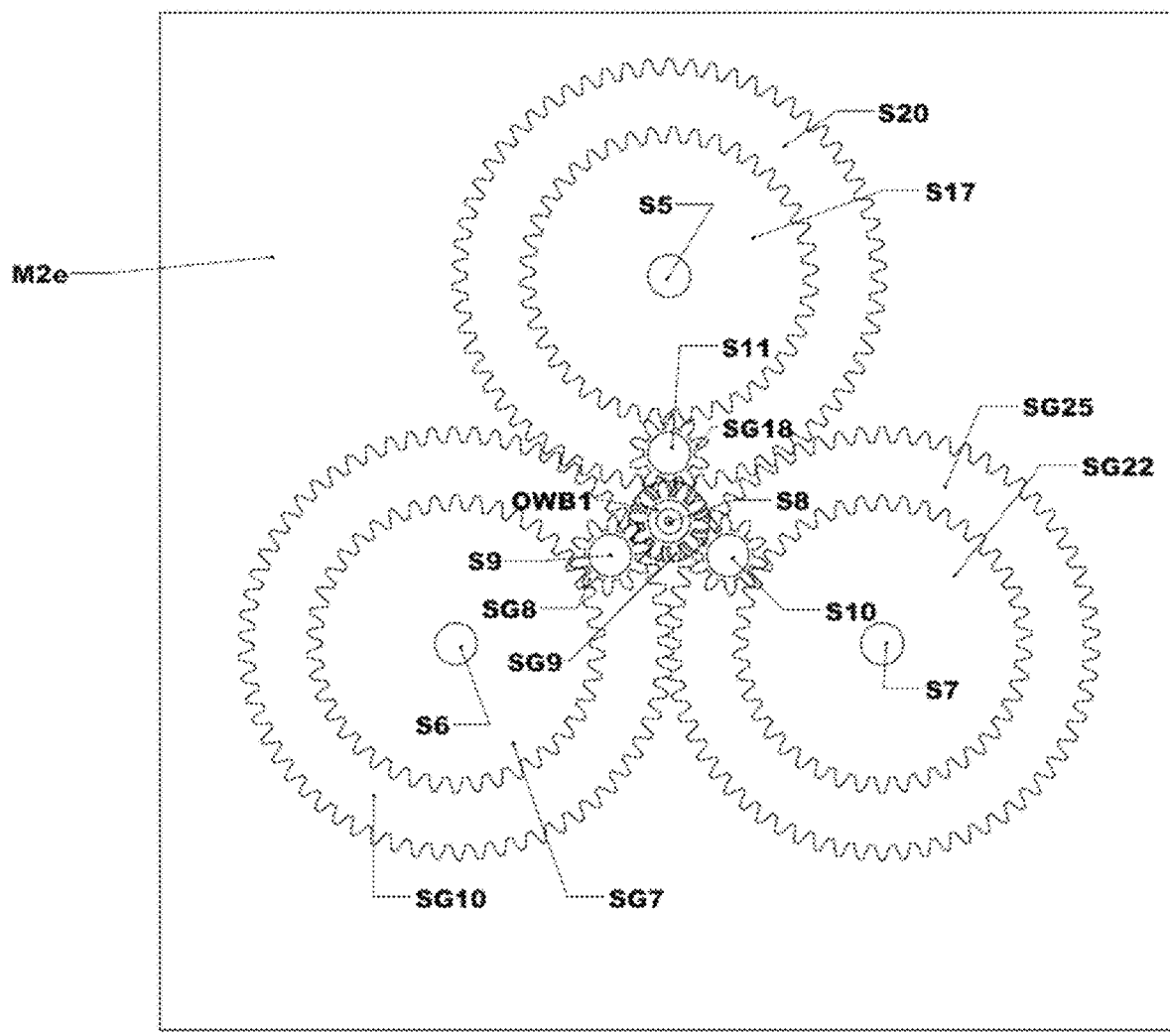
FIG. 33 illustrates a partial cross-sectional view taken along lines A-A of FIG. 32 of the gears between the middle and lower housing according to the principles of the present teachings with portions removed for clarity.
Figure 34:
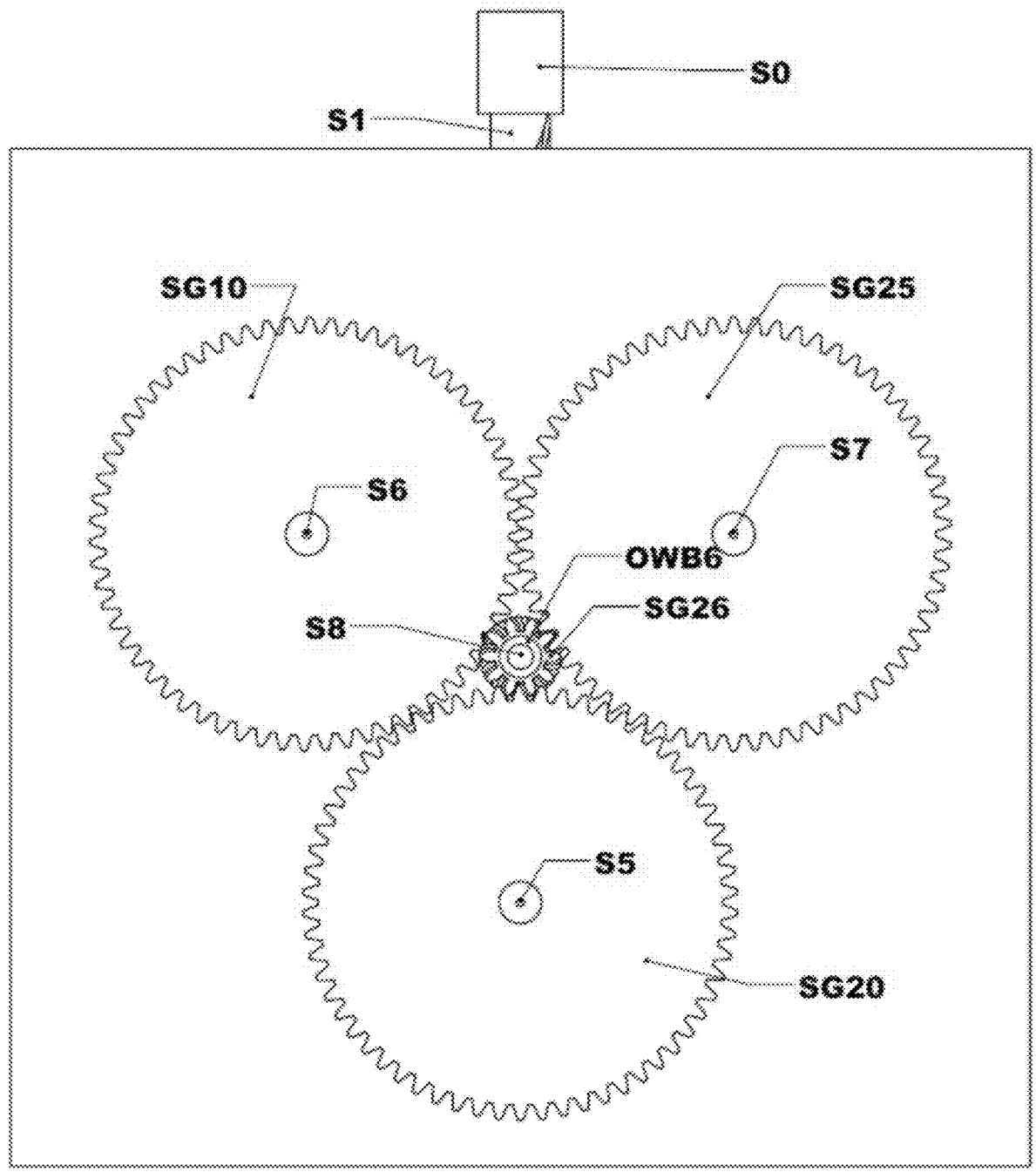
FIG. 34 illustrates a partial cross-sectional view taken along lines B-B of FIG. 32 of the gears between the middle and lower housing according to the principles of the present teachings with portions removed for clarity.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Construction

According to the principle of the present teachings, as illustrated in FIGS. 2-17 for a first embodiment and FIGS. 18-34 for a second embodiment, a device is provided for harnessing wave energy wherein multi-directional forces are absorbed and focused into a one directional rotational motion. For description purpose, (FIG. 1A) the X-axis is considered horizontal (parallel to the upper and lower edge of this page), Y-axis is vertical (parallel to the left and right edge of this page) and the Z-axis is normal to the XY plane. Rotation of components with axes parallel to the X-axis will be considered clockwise (cw) or counter-clockwise (ccw) when looking from left to right. For components with axes parallel to the Y-axis, rotational direction clockwise or counter-clockwise will be determined when looking from top to bottom. Likewise, for components with axes that intersects the XY plane, the direction of rotation will be determined as when looking towards the XY plane along the respective axis.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 2-38, in some embodiments, such as the first (see FIGS. 2-17) and second (see FIGS. 18-34) embodiments, Housing Plates M2$a$ and M2$c$ are parallel to each other and perpendicular to the XZ plane. In the first embodiment, Housing Plates M2$b$1 and M2$d$ are parallel to the XZ plane. In the second embodiment, however, we simply call Housing Plate M2$b$1 as Housing Plate M2$b$. Housing M2$b$1 in the first embodiment and Housing M2$b$ in the second embodiment serve the same function. Housing M2$b$1 (in the first embodiment)/M2$b$ (in the second embodiment) is attached to the bottom face of Housing Plates M2$a$ and M2$c$. The Housing Plates M2$b$1 (in the first embodiment)/M2$b$ (in the second embodiment) and M2$d$ will always lie on the horizontal XZ plane. Housing Plates M2$a$ and M2$c$ are always perpendicular to the XZ plane. The Housing Plates M2$a$, M2$b$1 (in the first embodiment)/M2$b$ (in the second embodiment) and M2$c$ together as a single unit can rotate about the Y-axis. The central circular hole through Plate M2$b$1 (in the first embodiment)/M2$b$ (in the second embodiment) and M2$d$ has an axis that passes through the Point of Origin O and is parallel to the Y-axis.

In both embodiments, the centre point and the point of Origin O is the intersection point of the axis of Shaft S1 and Shaft S2$b$. Shaft S2$a$, S2$b$, and S2$c$ are attached together with S2$b$ being in the centre, S2$a$ on the left and S2$c$ on the right. They share the same axis and are parallel to the XZ plane. The free end of Shaft S2a is supported by the Bushing BU1 situated on Housing M2a. The free end of Shaft S2c is supported by the Bushing BU2 situated on Housing M2c. Housing M2a and M2c support the Shafts S2a, S2b and S2c. Shaft S2a, S2b and Shaft S2c rotate in unison as they are attached together.

In the first embodiment, on Shaft S2a between Housing M2a and Shaft S2b a Bevel Gear BG3 is mounted such that the teeth of BG3 face the left side of Shaft S2b. A Bushing BU3 is provided on the ID surface of Bevel Gear BG3 to reduce rotational friction. Bevel Gear BG3 can rotate independently on Shaft S2a. In the second embodiment, a Bevel Gear BG2 of a similar nature as BG3 in the first embodiment, is attached via a Bushing BU3 to the left side of Shaft S2b. In the first embodiment, the hub faces of Bevel Gears BG4 and BG5 are attached to each other such that they rotate in unison. The assembly of Bevel Gears BG4 and BG5 are mounted on Shaft S2c such that the teeth of Bevel Gear BG4 face the right side of Shaft S2b. A Bushing BU4 is provided on the ID surface of Bevel Gears BG4 and BG5 to reduce rotational friction. Bevel Gears BG4 and BG5 can rotate together and independently on Shaft S2c. Gears of a similar nature as BG4 and BG5 are not present in the second embodiment.

In both embodiments, a Regular Bearing RB1 is positioned in the central cylindrical opening of Shaft S2b. The Input Shaft S1 passes through the Regular Bearing RB1 in the central cylindrical opening of Shaft S2b and can rotate independently about its own axis. The Input Shaft S1 is along the Z-axis in the neutral position for illustration, however it can move around in different directions. The axis of Shaft S1 passes through the point of origin O. One end of the shaft which is the driving end is farthest from the device. The driving end of Input Shaft S1 can be moved up and down (along Y-axis), moved sideways (along X-axis), moved obliquely (combination of x and Y-axis) and rotated about its axis. When the driving end is moved the axis of the input shaft can assume any position that cuts through the x y plane through the point of origin O.

In the first embodiment, one Way Bearing OWB1 is mounted on the Input Shaft S1 facing the front side of Shaft S2b. The Bevel Gear BG1 is mounted on the One Way Bearing OWB1 such that it engages with Bevel Gears BG3 and BG4 on the front side of Shaft S2b. The orientation of OWB1 is such that when Shaft S1 is rotated counter-clockwise it imparts counter-clockwise rotation to Bevel Gear BG1. During clockwise rotation of Shaft S1 no rotation is imparted to BG1. Bevel Gear BG1 when rotated counter-clockwise cannot impart any rotation to Shaft S1 but when rotated clockwise it can impart rotation to Shaft S1 in the clockwise direction. Similarly, another One Way Bearing OWB2 is mounted on the Input Shaft S1 facing the rear side of Shaft S2b. The Bevel Gear BG2 is mounted on the One Way Bearing OWB2 such that it engages with Bevel Gears BG3 and BG4 on the rear side of Shaft S2b. The orientation of OWB2 is such that when Shaft S1 is rotated clockwise it imparts clockwise rotation to Bevel Gear BG2. During counter-clockwise rotation of Shaft S1 no rotation is imparted to BG2. Bevel Gear BG2 when rotated clockwise cannot impart any rotation to Shaft S1 but when rotated counter-clockwise it can impart rotation to Shaft S1 in the counter-clockwise direction. The axis of Bevel Gear BG1 and BG2 and the axis of Bevel Gear BG3 and BG4 are perpendicular to each other and intersect at their centre points, which is also the point of origin O. The four Bevel Gears BG1, BG2, BG3 and BG4 mesh together and rotate in unison. BG1 and BG2 rotate along its axis and also revolve about the axes of Bevel Gears BG3 and BG4. When the driving end of Input Shaft S1 is moved up and down along the y-axis, Bevel Gears BG1 and BG2 makes a planetary motion around gears BG3 and BG4. Similarly, when the Input Shaft S1 is moved left and right, the Shafts S2a, S2b and S2c also revolve about the Y-axis along with the Housing plates M2a, M2b1 and M2c.

In the second embodiment, however, things are a little different. No One Way Bearing OWB1n is mounted on the Input Shaft S1. Instead, Bevel Gear BG1 is rigidly mounted to Input Shaft S1 such that it meshes with Bevel Gear BG2 in front of Shaft S2b. As a result, Shaft S1 and Bevel Gear BG1 rotate in unison.

In both the First and second embodiments, the input Shaft S1 has a Helical Groove M3 machined on its surface at the driving end. A Hollow Actuator Shaft S0 has a Key M1 protruding out of its ID surface. The Shaft S1 is inserted into the Hollow Actuator Shaft S0 such that the Key M1 rides in the Helical Groove M3 machined on the outer surface of Shaft S1. When the Hollow Actuator Shaft S0 is rotated due to rolling motion of the waves about the axis of Shaft S0 and S1, the Key M1 will impart rotary motion to the Helical Groove M3 thus turning the Input Shaft S1. When the Hollow Actuator Shaft S0, is reciprocated due to surge motions of the waves along the axis of Shaft S1, the Key M1 will slide through the groove M3 imparting rotary motion to the Helical Groove M3 thus turning the Input Shaft S1. Moving the Actuator Hollow Shaft S0 towards or away from Bevel Gears will impart clockwise or counter-clockwise rotation, respectively to Shaft S1.

Henceforth, the arrangements of the gears in the first and second embodiments vary sufficiently enough that the first embodiment will be explained first, followed by the second embodiment.

In the first embodiment, the One Way Bearing OWB3 is mounted on Shaft S2c between the teeth of Bevel Gear BG5 and the Housing Plate M2c. The Bevel Gear BG6 is mounted on the One way Bearing OWB3 such that the teeth of BG6 face the teeth of BG5. The orientation of the One Way Bearing OWB3 is such that when Shaft S2c rotates in the clockwise direction it imparts clockwise rotation to Bevel Gear BG6. When Shaft S2c rotates in the counter-clockwise direction no torque is imparted to Bevel Gear BG6. Bevel Gear BG6 when rotated clockwise cannot impart any rotation to Shaft S2c but when rotated counter-clockwise it can impart rotation to Shaft S2c in the counter-clockwise direction. Bevel Gears BG5 and BG6 face each other. A Hollow Shaft S3 is assembled on Housing plate M2b1 such that it is perpendicular to Plate M2b1 and also perpendicular to the axis of Shaft S2c. Furthermore, Shaft S3 exists above and below Housing Plate M2b1 and is also below Shaft S2c. The axis of Shaft S3 when extend upwards intersect with the axis of Shaft S2c at right angle. The axis of Shaft S3 is equidistant from the faces of Bevel Gears BG5 and BG6. Above plate M2b1 and surrounding Shaft S3 a cylindrical Housing M2b2 is provided. Cylindrical Housing M2b2 is fixed/bolted to Plate M2b1. A Bushing BU4 is provided on the ID surface of Housing M2b2 to allow free rotation of Shaft S3. Shaft S3 can rotate freely inside Housing M2b2. On the upper end of Shaft S3, the Bevel gear BG7 is keyed such that BG7 mates with both Bevel gears BG5 and BG6. On the lower end of Shaft S3 the Spur Gear SG1 is keyed. Bevel Gear BG7, Shaft S3 and Spur Gear SG1 rotate in unison. Between Bevel Gear BG7 and housing M2b2 a Thrust Bearing TB1 is provided. A Stopper ST1 is provided at the lower end of Shaft S3 to keep Spur Gear SG1 in position. The Shaft S3 has a shoulder at the upper end to prevent it from sliding down through Bevel Gear BG7.

The upper end of the Sway and Yaw Shaft S4 is bolted onto the central cylindrical holes on Housing Plate M2b1. The lower end of Shaft S6 is inserted into the Lower Stopper ST2 which is bolted on to the lower face of the Housing Plate M2d. The shoulder on the lower end of Shaft S6 is located inside the Stopper ST2. Inside the Stopper ST2, Regular Bearings RB2 and RB3 are positioned above and below the shoulder on the lower end of Shaft S6. The Stopper ST2 along with the Regular Bearings RB2 and RB3, Plate M2d and the shoulder on Shaft S6 ensures Shaft S6 is held in position and rotates freely. This arrangement allows for Shaft S6 to rotate about its own axis (Y-axis) when the upper Housing Assembly of M2a, M2b1 and M2d are rotated as a whole unit about Y-axis.

The Hollow Stepped Unidirectional Final Output Shaft S5 is slid over upper end of Shaft S4 such that the section with the smaller diameter is above the section with the larger diameter. Between Shaft S4 and smaller diameter section of Shaft S5, the One Way Bearing OWB4 is provided. The inner and outer surfaces of OWB4 are keyed to Shaft S4 and S5, respectively. The orientation of One Way Bearing OWB4 is such that when Shaft S4 is rotated clockwise, clockwise rotation is imparted to Shaft S5. When Shaft S4 is rotated counter-clockwise, no rotation is imparted to Shaft S5. Similarly when Shaft S5 is rotated clockwise no rotation is imparted to Shaft S4, whereas when Shaft S5 is rotated counter-clockwise, counter-clockwise rotation is imparted to Shaft S4. The Spur Gear SG2 is keyed on the upper end of Shaft S5 such that it mates with Spur Gear SG1.

On lower part of Shaft S4, across the larger diameter section of Shaft S5, the One Way Bearing OWB5 is provided. On One Way Bearing OWB5, the Spur Gear SG3 is mounted. The inner and outer surfaces of OWB5 are keyed to Shaft S4 and Spur Gear SG3, respectively. The orientation of the One Way Bearing OWB5 is such that when Shaft S4 rotates in the counter-clockwise direction it imparts counter-clockwise rotation to Spur Gear SG3. When Shaft S4 rotates in the clockwise direction no torque is imparted to Spur Gear SG3. Spur Gear SG3 when rotated counter-clockwise cannot impart any rotation to Shaft S4 but when rotated clockwise it can impart clockwise rotation to Shaft S4. The orientations of the One Way Bearings OWB4 and OWB5 are opposite to each other.

On lower end of Shaft S5, at the section with the larger diameter an internal Spur Gear SG5 is provided. Spur Gear SG5 is keyed to the ID surface of Shaft S5. An intermediary vertical stationary Shaft S6 is assembled on the bottom Housing Plate M2d such that it is parallel to Shaft S4. The Idler Spur Gear SG4 is mounted on Shaft S6 such that it mates with Spur Gear SG3 and the internal Spur Gear SG5. The Idler Spur Gear SG4 is driven by Spur Gear SG3 and SG4 does not impart any rotation to Shaft S6. The small diameter section of Shaft S5 carries the Flywheel M4 and the Out Put Pulley M5.

The Hollow Actuator Shaft S0 and the Input Shaft S1 is along the Z-axis for illustration however it can move around in different directions. The axis of Shaft S1 always passes through the point of origin O. One end of the shaft S1 which is the driving end is the farthest end from the device. The Hollow Actuator Shaft engages with the driving end of Shaft S1. The Helical Groove M3 at the driving end of Shaft S1 engages with the Key M1 of the Actuator Shaft S0.

In the second embodiment, a Shaft S3 is fixed rigidly to one end of the Housing M2b such that the face of M2b is perpendicular to the axis of the Shaft S3. The other end of Shaft S3 rotates freely inside Plate M2d. A hollow Shaft S4 is mounted on Shaft S3 such that Shafts S3 and S4 can rotate independently.

On the upper end of Shaft S4 a Bevel gear BG3 is rigidly mounted such that BG3 meshes with BG2. On the lower end of Shaft S4 a Spur Gear SG1 is rigidly mounted. Bevel Gear BG3, Shaft S4 and Spur Gear SG1 can rotate as one unit. Towards the lower end of Shaft S3 above the Plate M2d a Spur Gear SG5 is rigidly mounted on Shaft S3. The housing unit M2a, M2b, M2c, Shaft S3 and Spur Gear SG5 can rotate as one unit. On the free end of Shaft S2c a Bevel Gear BG4 is rigidly mounted which mates with Bevel Gear BG5 freely mounted on the middle section of Shaft S4. A Spur Gear SG3 is also freely mounted on Shaft S4 and is rigidly attached to Bevel Gear BG5. Bevel Gear BG5 and Spur Gear SG3 can rotate freely and independently as one unit on Shaft S4.

The horizontal rigid Support Plate M2d holds Shaft S3 and allows Shaft S3 to rotate freely about its axis. Support plate M2d houses three Shafts S5, S6 and S7 and also allow them to rotate independently about their own axis respectively. A portion of the Shafts S5, S6 and S7 extends above and below Plate M2d.

Shaft S5 on its upper and lower end has Spur Gear SG6 and SG20 rigidly mounted respectively. Shaft S5 has another Spur Gear SG17 rigidly mounted above Spur Gear SG20 and below the support plate M2d.

Shaft S6 on its upper and lower end has Spur Gear SG4 and SG10 rigidly mounted respectively. Shaft S5 has another Spur Gear SG7 rigidly mounted above Spur Gear SG10 and below the support plate M2d.

Shaft S7 on its upper and lower end has Spur Gear SG2 and SG25 rigidly mounted respectively. Shaft S7 has another Spur Gear SG22 rigidly mounted above Spur Gear SG25 and below the support plate M2d.

Support plate M2d houses three rigid non rotating Shafts S9, S10 and S11. Shafts S9, S10 and S11 extends only below Plate M2d. On the lower end of Shaft S9, Idler Spur Gear SG8 is mounted and can rotate freely on S9. On the lower end of Shaft S10, Idler Spur Gear SG23 is mounted and can rotate freely on S10. On the lower end of Shaft S11, Idler Spur Gear SG18 is mounted and can rotate freely on S11.

The horizontal rigid Support Plate M2e holds Output Shaft S8 and allows Shaft S8 to rotate freely about its axis. A portion of Shaft S8 extends above and below Plate M2e. On the portion of Output Shaft S8 that extends above Plate M2e, six one way bearings OWB1, OWB2, OWB3, OWB4, OWB5 and OWB6 are mounted. All the One Way Bearings are oriented such that only clockwise rotation is imparted to Output Shaft S8. OWB1 is the top most one way bearing and is followed by OWB2, OWB3, OWB4, OWB5 and OWB6. On these six One way Bearings six Spur Gears SG9, SG11, SG19, SG21, SG24 and SG26 are mounted respectively. SG9 being the top most Spur Gear on Shaft S8 and followed by SG11, SG19, SG21, SG24 and SG26.

Spur Gear SG9 meshes with Idler Spur Gear SG8. Spur Gear SG11 meshes with Spur Gear SG10. Spur Gear SG19 meshes with Idler Spur Gear SG18. Spur Gear SG21 meshes with Spur Gear SG20. Spur Gear SG24 meshes with Idler Spur Gear SG23. Spur Gear SG26 meshes with Spur Gear SG25.

On the portion of the Output Shaft that Extends below M2e, a Flywheel M3 and an Output Pulley M4 are rigidly mounted.

Rolling Motion

Figure 35:
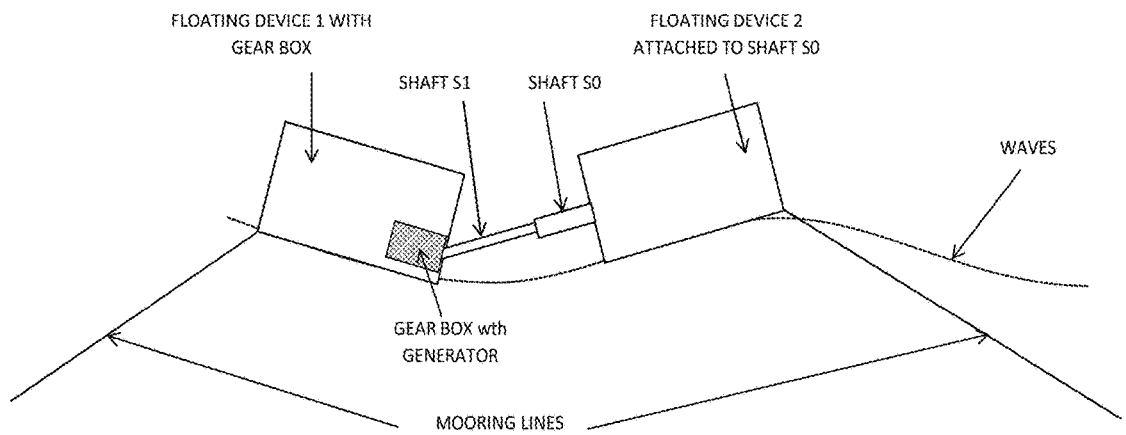
FIG. 35 illustrates the energy harvesting device incorporated into a two float deployment system according to the principles of the present teachings.
Figure 36:
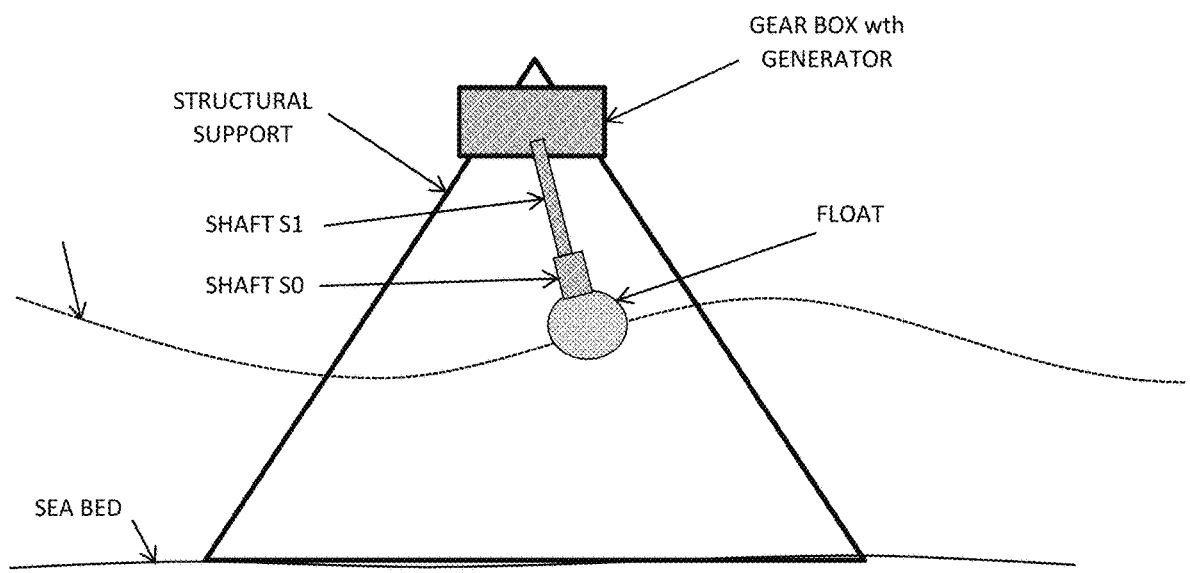
FIG. 36 illustrates the energy harvesting device incorporated into a deployment configuration with the gear assembly upside down on the platform according to the principles of the present teachings.
Figure 37:
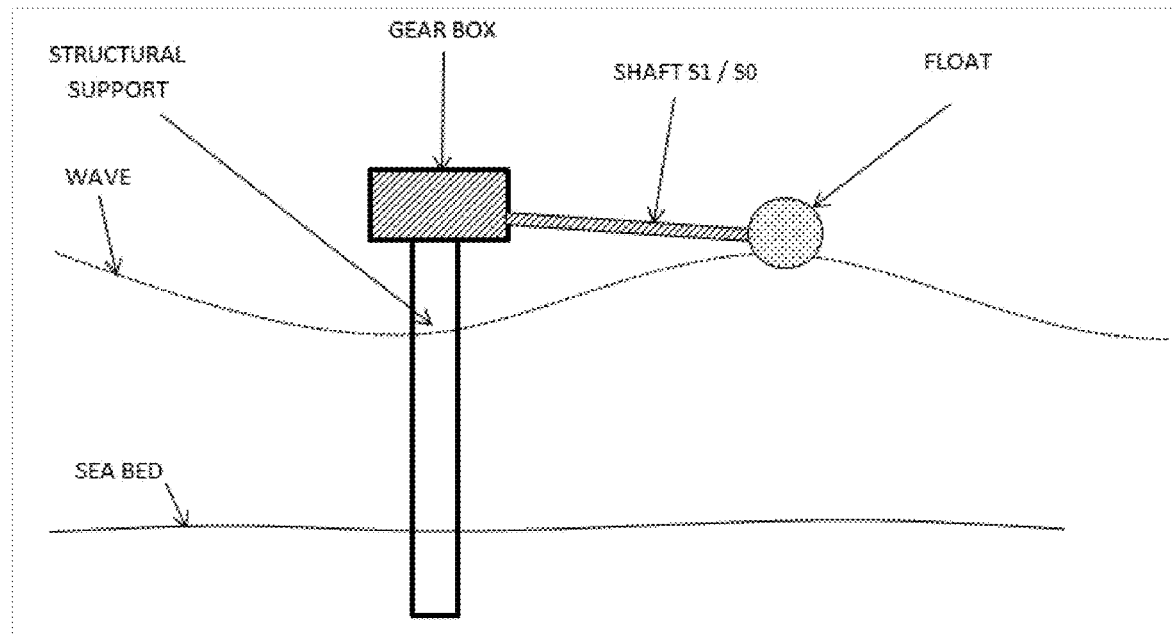
FIG. 37 illustrates the energy harvesting device incorporated into a deployment configuration with the gear assembly vertical on the platform according to the principles of the present teachings.
Figure 38A:
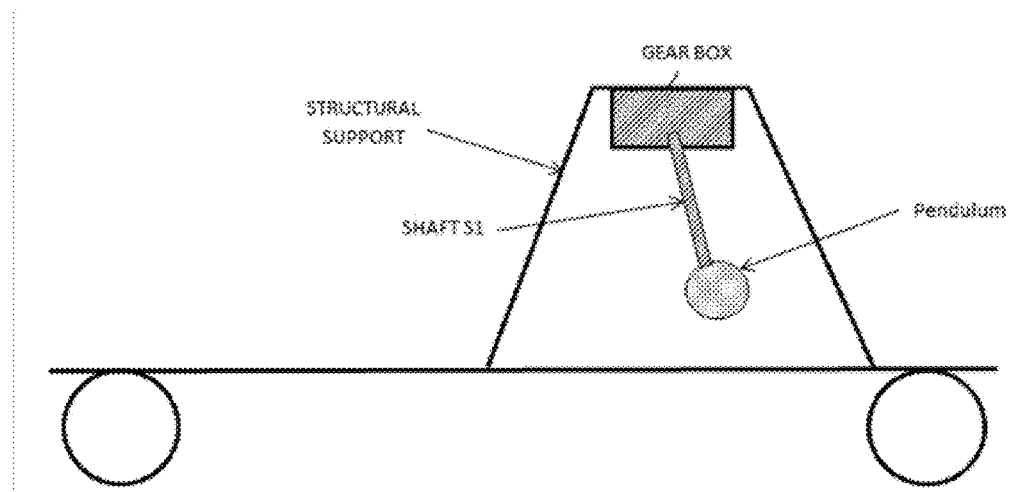
FIGS. 38A and 38B illustrate the energy harvesting device incorporated into a deployment configuration on vehicles and boats, respectively, according to the principles of the present teachings.
Figure 38B:
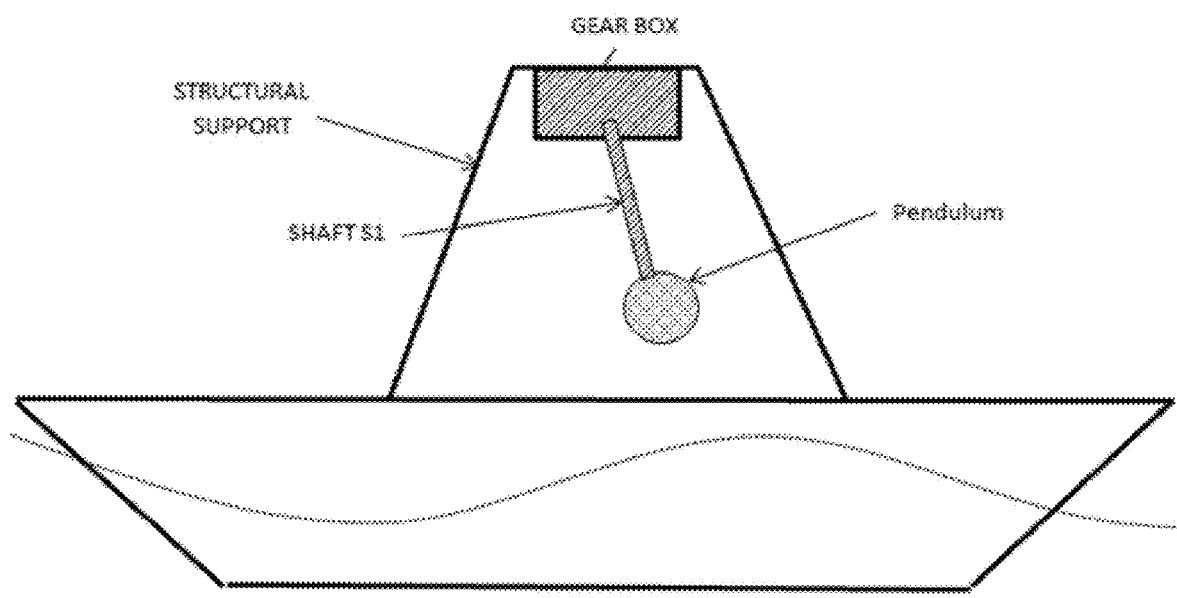

The Actuator Shaft S0 is attached to a floating device (see FIGS. 35-37). When the float rolls, Shaft S0 is rotated about its axis and the Key M1 on Shaft S0 turns the Helical Groove M3 thus imparting rotation to Shaft S1. Based on the direction of the floats rolling motion Shaft S1 will be rotated in the same direction.

Surging Motion

Surging motion occurs when the float moves towards or away from the device. When the float moves towards the device, the Actuator Shaft S0 slides on Shaft S1 towards the point of origin O. This sliding motion will cause the key M1 on Shaft S0 to slide inside the Helical groove M3 on Shaft S1. As the Actuator Shaft S0 is not rotating with respect to Shaft S1 and only sliding, the Key M1 will transmit torque to the Helical Groove M3 and thus rotate the Shaft S1. When the Actuator Shaft S0 slides on Shaft S1 towards the point of origin, Shaft S1 will turn clockwise. When the Actuator Shaft S0 slides on Shaft S1 away from the point of origin, Shaft S1 will turn counter-clockwise.

Heaving and Pitching Motions

When the float moves up and down, the Actuator Shaft S0 also moves up and down. This results in the Shaft S1 revolving about the axis of Shafts S2a, S2b and S2c. The axis of Shaft S1 and S2b are always perpendicular to each other. As the Shaft S1 passes through Shaft S2b the revolutionary motion is converted as rotation of the Shafts S2a, S2b and S2c as one unit about its own axis.

Sway and Yaw Motions

When the float moves sideways, the Actuator Shaft S0 also moves sideways. This results in the Shaft S1 revolving about Y-axis. As Shaft S1 passes through Shaft S2b the sideways motion is converted as revolution of the Shafts S2a, S2b and S2c as one unit about the Y-axis. When Shafts S2a, S2b and S2c revolve about the Y-axis it imparts rotation to the Housing Assembly M2a, M2b1 (in case of first embodiment)/M2b (in case of the second embodiment) and M2c. This will result in Shaft S4 rotating about its axis (Y-axis) in the first embodiment and Shaft S3 rotating about its axis (also Y axis) in the second embodiment.

Motion Capture—Capturing Rolling and Surging Motion

In the first embodiment, when the Actuator Shaft S0 is either rotated by the rolling motion of the waves or reciprocated on Shaft S1 by the surging motion of the waves, the result is always the rotation of Shaft S1 either in the clockwise or counter-clockwise direction depending on the direction of the roll or surge.

When Shaft S1 is rotated counter-clockwise it sets Bevel Gear BG1 in counter-clockwise rotation and imparts no torque to Bevel Gear BG2 due to the orientation of One Way Bearing OWB1 and OWB2. Bevel Gear BG1 in turn imparts clockwise rotation to Bevel Gear BG3 and counter-clockwise rotation to Bevel Gear BG4. Bevel Gear BG3 and BG4 in turn impart clockwise rotation to Bevel Gear BG2. Finally due to the orientation of OWB2, BG2 rotates unobstructed on Shaft S1 in the clockwise direction while the Shaft S1 and Bevel Gear BG1 rotate counter-clockwise.

On the other hand when Shaft S1 is rotated clockwise it sets Bevel Gear BG2 in clockwise rotation and imparts no torque to Bevel Gear BG1 due to the orientation of One Way Bearing OWB1 and OWB2. Bevel Gear BG1 in turn imparts clockwise rotation to Bevel Gear BG3 and counter-clockwise rotation to Bevel Gear BG4. Bevel Gear BG3 and BG4 in turn impart counter-clockwise rotation to Bevel Gear BG1. Finally due to the orientation of OWB1, BG1 rotates freely on Shaft S1 in the counter-clockwise direction while the Shaft S1 and Bevel Gear BG2 rotate clockwise.

Therefore, no matter which direction Shaft S1 is rotated the four Bevel Gears BG1, BG2, BG3 and BG4 rotate in the counter-clockwise, clockwise, clockwise and counter-clockwise directions, respectively. When Shaft S1 rotates counter-clockwise BG1 also rotating counter-clockwise becomes the driving gear and BG2 rotating clockwise becomes the driven gear. On the other hand, when Shaft S2 rotates clockwise BG2 also rotating clockwise becomes the driving gear and BG1 rotating counter-clockwise becomes the driven gear.

Clockwise or counter-clockwise rolling motion or the forward or reverse surging motion of the waves will set the Bevel Gear BG4 in the counter-clockwise direction. As the Bevel Gear BG4 and BG5 are attached together, the counter-clockwise rotation of BG4 will also result in the counter-clockwise rotation of BG5. The Bevel Gears BG4 and BG5 will freely rotate on Shaft S2c as they are separated by the friction reducing Bushing BU4. Bevel Gear BG5 will in turn rotate Bevel Gear BG7 in the counter-clockwise direction. Bevel Gear BG7 will then in turn rotate Bevel Gear BG6 in the clockwise direction.

Therefore Roll or Surge motions in any direction will set Bevel Gear BG7 in the counter-clockwise direction. As the Bevel Gear BG7 and Spur Gear SG1 are keyed to Shaft S3, the counter-clockwise rotation of BG7 will also result in the counter-clockwise rotation of Spur Gear SG1. The counter-clockwise rotation of Spur Gear SG1 will impart clockwise rotation to its meshing Spur Gear SG2. As the Spur Gear SG2 is keyed to the Hollow Stepped Unidirectional Final Output Shaft S5, the clockwise rotation of SG2 will also result in the clockwise rotation of the Final Output Shaft S5.

Finally Roll and Surge Motion in any direction will only result in the Final Output Shaft S5 rotating in the clockwise direction.

In the second embodiment, when Shaft S1 is turned BG1 is turned cw or ccw. BG1 will turn BG2 cw or ccw. BG2 will turn BG3, S4 and SG1 cw and ccw. SG1 in turn rotates SG2, S7, SG22 and SG25 cw & ccw. SG22 will rotate SG23 cw & ccw. SG23 will rotate SG24 cw & ccw. SG25 will rotate SG26 cw & ccw. So when S1 is rotated cw or ccw BG1, BG2, BG3, S4, SG1, SG2, S7, SG22, SG23, SG24, SG25 and SG26 will rotate cw or ccw.

When the free end of S1 is rotated cw BG1 will turn cw (looking at BG1 from S0). BG1 will turn BG2 ccw (looking at BG2 from free end of S2a). BG2 will turn BG3, S4 and SG1 ccw (looking downwards). SG1 will turn SG2, S7, SG22, SG25 cw. SG22 will turn SG23 ccw. SG23 will turn SG24 cw. SG24 will be able to turn Output Shaft S8 in the ccw direction as OWB5 is oriented to impart only cw rotation to S8. SG25 will turn SG26 ccw. Now SG26 will not be able to turn Output Shaft S8 in the cw direction as OWB6 is oriented to impart only cw rotation to Shaft S8. So when the free end of Shaft S1 is rotated cw, cw rotation is also imparted to Output Shaft S8 through BG1, BG2, BG3, S4 SG1, SG2, S7, SG22, SG23, SG24 and OWB5.

When the free end of S1 is rotated ccw BG1 will turn ccw. BG1 will turn BG2 cw. BG2 will turn BG3, S4 and SG1 cw. SG1 will turn SG2, S7, SG22, SG25 ccw. SG22 will turn SG23 cw. SG23 will turn SG24 ccw. SG24 will not be able to turn Output Shaft S8 in the cw direction as OWB5 is oriented to impart only cw rotation to S8. But SG25 will turn SG26 cw. Now SG26 will be able to turn Output Shaft S8 in the cw direction as OWB6 is oriented to impart only cw rotation to Shaft S8. So when the free end of Shaft S1 is rotated ccw, cw rotation is imparted to Output Shaft S8 through BG1, BG2, BG3, S4, SG1, SG2, S7, SG25, SG26 and OWB6.

Therefore, in any case when the free end of Shaft S1 is rotated cw or ccw Output Shaft S8 is rotated in the cw direction either by OWB6 or OWB5.

Motion Capture—Capturing Heaving and Pitching Motion

In the first embodiment, when Heaving and Pitching occurs, the driving end of Shaft S1 is moved up or down along the Y-axis by the Actuator Shaft S0. When the driving end of Shaft S1 is moved up or down, the Bevel Gears BG1 and BG2 as they are mounted on Shaft S1, together revolve about the axis of shafts S2a, S2b and S2c in a planetary motion around their mating Bevel Gears BG3 and BG4.

When the Shaft S1 is moved up, Bevel Gear BG1 and BG2 makes a counter-clockwise planetary motion around Bevel Gear BG3 and BG4. Due to the orientation of One Way Bearings OWB1 and OWB2 Bevel Gear BG1 and BG2 rotates counter-clockwise and clockwise, respectively and rotates the meshing Bevel Gears BG3 and BG4 in the clockwise and counter-clockwise direction, respectively. As the Bevel Gear BG4 and BG5 are attached together, the counter-clockwise rotation of BG4 will also result in the counter-clockwise rotation of BG5. The Bevel Gears BG4 and BG5 will freely rotate on Shaft S2c as they are separated by the friction reducing Bushing BU4. Bevel Gear BG5 will in turn rotate Bevel Gear BG7 in the counter-clockwise direction. Bevel Gear BG7 will then in turn rotate Bevel Gear BG6 in the clockwise direction.

When the driving end of Shaft S1 is moved down, Bevel Gear BG1 and BG2 makes a clockwise planetary motion around Bevel Gear BG3 and BG4. Due to the orientation of One Way Bearings OWB1 and OWB2 the teeth of Bevel Gear BG1 and BG2 ride on the teeth of its meshing Bevel Gears BG3 and BG4 in the clockwise direction imparting no rotation to BG3 and BG4. However, Shafts S2a, S2b and S2c are set in clockwise rotation by Shaft S1 as it passes through Shaft S2b. Shaft S2a and Shaft S2c do not impart any rotation to Bevel Gear BG3, BG4 and BG5 as Shaft S2a and Shaft S2c freely rotate in the Bushings BU3 and BU4, respectively. Due to the orientation of One Way Bearing OWB3 the clockwise rotation of Shaft S2c imparts clockwise rotation to Bevel Gear BG6. Bevel Gear BG6 will in turn rotate Bevel Gear BG7 in the counter-clockwise direction. Bevel Gear BG7 will then in turn rotate Bevel Gear BG5 in the counter-clockwise direction. As Bevel Gears BG5 and BG4 are attached together BG4 also rotates in the counter-clockwise direction. Bevel Gear BG4 will in turn set the Bevel Gears BG1 and BG2 to rotate in the counter-clockwise and clockwise direction, respectively. Finally BG1 and BG2 will rotate the Bevel gear BG3 in the clockwise direction.

Therefore, in both of the cases where the driving end of Shaft S1 is either moved up or down, all the meshing gears BG1, BG2, BG3, BG4, BG5, BG6 and BG7 rotate in the counter-clockwise, clockwise, clockwise, counter-clockwise, counter-clockwise, clockwise and counter-clockwise directions, respectively. The only difference is the direction of transmission of power. When the driving end of Shaft S1 is moved down, Bevel Gear BG6 becomes the driving gear and ends up rotating BG3 through the meshing gear train. On the other hand, when the driving end of Shaft S1 is moved up, BG6 becomes the final driven gear.

Heave and Pitch motion in any direction will set Bevel Gear BG7 in the counter-clockwise direction. As the Bevel Gear BG7 and Spur Gear SG1 are keyed to Shaft S3, the counter-clockwise rotation of BG7 will also result in the counter-clockwise rotation of Spur Gear SG1. The counter-clockwise rotation of Spur Gear SG1 will impart clockwise rotation to its meshing Spur Gear SG2. As the Spur Gear SG2 is keyed to the Hollow Stepped Unidirectional Final Output Shaft S5, the clockwise rotation of SG2 will also result in the clockwise rotation of the Final Output Shaft S5.

Finally Heave and Pitch Motion in any direction will only result in the Final Output Shaft S5 rotating in the clockwise direction.

In the second embodiment, When the free end of Shaft S1 is moved up and down, Shafts S2a, S2b and S2c rotates cw & ccw inside M2a and M2c. As BG4 is rigidly mounted to S2c, BG4 also rotates cw and ccw along with S2c. BG4 in turn rotates BG5, and SG3 cw & ccw. As BG5 and SG3 are not rigidly mounted on S4, S4 will not rotate. SG3 will in turn rotate SG4, S6, SG7 and SG10 cw and ccw. SG7 will turn Idler Spur Gear SG8 and SG10 will turn SG11 cw and ccw. Idler Spur Gear SG8 will turn SG9 cw and ccw. So when S1 is moved up and down BG4, BG5, SG3, SG4, SG7, SG8, SG9, SG10 and SG11 rotate cw and ccw.

When the free end of Shaft S1 is moved up BG4 turns BG5 and SG3 cw (looking downwards). SG3 will turn SG4, SG7 and SG10 ccw. SG7 will turn SG8 cw. SG8 will turn SG9 ccw. But SG9 will not be able to turn Output Shaft S8 in the ccw direction as OWB1 is oriented to impart only cw rotation to S8. But SG10 will turn SG11 cw. Now SG11 will be able to turn Output Shaft S8 in the cw direction as OWB2 is oriented to impart cw rotation to Shaft S8. So when Shaft S1 is moved up cw rotation is imparted to Output Shaft S8 through BG4, BG5, SG3, SG4, SG10, SG11 and OWB2.

When the free end of Shaft S1 is moved down BG4 turns BG5 and SG3 ccw (looking downwards). SG3 will turn SG4, SG7 and SG10 cw. SG7 will turn SG8 ccw. SG8 will turn SG9 ccw. SG9 will be able to turn Output Shaft S8 in the cw direction because OWB1 is oriented to impart cw rotation to Shaft S8. SG10 will turn SG11 in ccw direction. But SG11 will not be able to turn Output Shaft S8 in ccw direction as OWB2 is oriented to impart only cw rotation to S8. So when Shaft S1 is moved down cw rotation is imparted to Output Shaft S8 through BG4, BG5, SG3, SG4, SG7, SG8, SG9 and OWB1.

Therefore, in any case when Shaft S1 is moved up or down Output Shaft S8 is rotated in the cw direction either by OWB1 or OWB2.

Motion Capture—Capturing Sway and Yaw Motion

In the first embodiment, when the driving end of Shaft S1 is moved sideways left to right or right to left the entire upper assembly of Shafts S1, S2a, S2b, S2c, S3 and S4, Bevel Gears BG1, BG2, BG3, BG4, BG5, BG6 and BG7, Spur Gear SG1, Housing M2a, M2b1, M2b2 and M2c rotate as a single unit. As the Housing M2b1 is bolted to Shaft S4, Shaft S4 will rotate supported by the Bottom Housing plate M2d and Stopper ST2.

When the driving end of Shaft S1 is moved leftward, the Shaft S4 is rotated in the clockwise direction. Due to the orientation of the One Way Bearing OWB4 and as it is keyed both to Shaft S4 and Shaft S5, Shaft S4 will directly rotate the Final Out Put Shaft S5 in the clockwise direction.

When the driving end of Shaft S1 is moved rightward, the Shaft S4 is rotated in the counter-clockwise direction. Due to the orientation of the One Way Bearing OWB5, Spur Gear SG3 will rotate in the counter-clockwise direction. The counter-clockwise rotation of SG3 will impart clockwise rotation to it mating Idler Spur Gear SG4. The clockwise rotation of Idler Spur Gear SG4 will impart clockwise rotation to it mating Internal Spur Gear SG5. Finally Internal Spur Gear SG5 will impart clockwise rotation to Final Output Shaft S5.

When Shaft S4 rotates in the clockwise the orientation of One Way Bearing OWB5 will not impart any rotation to Spur Gear SG3 and similarly when Shaft S4 rotates in the counter-clockwise the orientation of One way Bearing OWB4 will not impart any rotation to Shaft S5.

Finally Sway and Yaw Motion in any direction will only result in the Final Output Shaft S5 rotating in the clockwise direction.

In the second embodiment, when Shaft S1 is moved sideways, Shafts S2a, S2b and S2c along with M2a, M2b, M2c and Shaft S3 rotates cw & ccw about the axis of Shaft S3. As SG5 is rigidly mounted on S3, SG5 also rotates cw and ccw along with Shaft S3. SG5 in turn rotates SG6, S5 and SG17 and SG20 cw & ccw. SG17 will rotate SG18 cw & ccw. SG18 will rotate SG19 cw & ccw. SG20 will rotate SG21 cw & ccw. So when the free end of Shaft S1 is moved sideways to the left and right S3, SG5, SG6, S5, SG17, SG18, SG19, SG20 and SG21 will rotate cw and ccw.

When the free end of S1 is moved to the left S3 and SG5 turn cw. SG5 will turn SG6, S5, SG17 and SG20 ccw. SG17 will turn SG18 cw. SG18 will turn SG19 ccw. But SG19 will not be able to turn Output Shaft S8 in the ccw direction as OWB3 is oriented to impart only cw rotation to S8. But SG20 will turn SG21 cw. Now SG21 will be able to turn Output Shaft S8 in the cw direction as OWB4 is oriented to impart cw rotation to Shaft S8. So when the free end of Shaft S1 is moved to the left cw rotation is imparted to Output Shaft S8 through S3, SG5, SG6, S5, SG20, SG21 and OWB4.

When the free end of S1 is moved to the right S3 and SG5 turn ccw. SG5 will turn SG6, S5, SG17 and SG20 cw. SG17 will turn SG18 ccw. SG18 will turn SG19 cw. SG19 will be able to turn Output Shaft S8 in the cw direction as OWB3 is oriented to impart only cw rotation to S8. SG20 will turn SG21 ccw. Now SG21 will not be able to turn Output Shaft S8 in the ccw direction as OWB4 is oriented to impart only cw rotation to Shaft S8. So when the free end of Shaft S1 is moved to the right cw rotation is imparted to Output Shaft S8 through S3, SG5, SG6, S5, SG17, SG18, SG19 and OWB3.

Therefore, in any case when the free end of Shaft S1 is moved sideways to the left or right Output Shaft S8 is rotated in the cw direction either by OWB3 or OWB4.

Motion Capture—Capturing simultaneous application of Roll, Surge, Heave and Pitch and Sway and Yaw Motion.

In the first embodiment, when the float Rolls the Hollow Actuator Shaft S0 is rotated about its own axis and the Key M1 of the Shaft S0 imparts torque and rotation to Helical Groove M3 of Input Shaft S1. Similarly when the float surges back or forth, the Hollow Actuator Shaft S0, slides over Input Shaft S1. During this sliding motion, when Key M1 of Shaft S0 rides/slides inside the Helical Groove M3 of Shaft S1, torque and rotation is imparted to Helical Groove M3 and Shaft S1. When both motions Roll and Surge occur simultaneously, then torque is imparted to the Helical Groove M3 by the Key M1 due to both the rotational motion and the sliding motion of Key M1 in the Helical Groove M3. The torque applied by the Key M1 to the Helical Groove M3 by Roll and Surge is additive and is finally transferred to the Input Shaft S1. This results in the counter-clockwise rotation of Bevel Gear BG5 as explained in "Capturing Rolling and Surging Motion."

Bevel Gear BG5 will be rotated in the counter-clockwise direction when Roll and Surge Motions and the upward Heave and Pitch motions are applied to the driving end of Shaft S1 as explained in "Capturing Rolling and Surging Motion" and "Capturing Heave and Pitch Motion." Similarly, Bevel Gear BG6 will be rotated in the clockwise direction when downward Heave and Pitch motions are applied to the driving end of Shaft S1 as explained in "Capturing Heave and Pitch Motion." In any case, the counter-clockwise and clockwise rotation of Bevel Gears BG5 and BG6, respectively will rotate Bevel Gear BG7 and Spur Gear SG1 in the counter-clockwise direction. When these motions occur simultaneously the torque provided by each motion to the Bevel Gear BG7 will be additive. The additive torque on Spur Gear SG1 will rotate Spur Gears SG2 in the clockwise direction which in turn will rotate the Final Output Shaft S5 in the clockwise direction.

When the float Sway and Yaw to the left or right, the driving end of Input Shaft S1 is moved sideways. As explained in "Capturing Sway and Yaw Motion" this will rotate Shaft S4 in either the clockwise or counter-clockwise direction depending on the direction of the Sway and Yaw motions. When Shaft S4 turns clockwise it imparts torque to the Final Output Shaft S5 in the clockwise direction as they are directly coupled through the One Way Bearing OWB4. This torque is additive to the torque received by Shaft S5 from Spur Gear SG2/SG1 by Roll and Surge and/or Heave and Pitch motions. When Shaft S4 turns counter-clockwise, Spur Gear SG3 will rotate Idler Spur Gear SG4 in the clockwise direction which will impart torque to the Internal Spur Gear SG5 in the clockwise direction thus rotating Final Output Shaft S5 also in the clockwise direction. This torque is also additive to the torque received by Shaft S5 from Spur Gear SG2/SG1 by Roll and Surge and/or Heave and Pitch motions.

Sway and Yaw motion in any direction will impart torque to the Final Output Shaft S5 only in the clockwise direction. Torque transmitted from Roll and Surge and/or Heave and Pitch will also rotate the Final Output Shaft in the clockwise direction through BG7, SG1 and SG2 Gears. Both these torques can be simultaneous and they are additive on Final Output Shaft S5.

As in the first embodiment, the simultaneous application of these different types of forces will result in the described motions happening simultaneously and the three train of gears will be set in motion simultaneously to impart cw rotation to the output Shaft S8. The advantage of this second embodiment is that the One Way Bearings are moved further downstream where the RPM is high and the torque is less. This allows the use of lower capacity one way bearings. The earlier design required one way bearings upstream of the gear train. This required one way bearings with higher capacity as the RPMs were low but torque was high.

Final Stage

Roll motion in any direction, Surge motion in any direction, Heave and Pitch Motion in any direction, and Sway and Yaw motion in any direction will only result in the Final Output Shaft S5 rotating in the clockwise direction. In the first embodiment as the Flywheel M4 and Output Pulley M5 are keyed to the Final Output Shaft S5 they are also set in clockwise rotation. In the second embodiment, the Output Shaft S8 rotates only in the clockwise direction, which in turn rotates Flywheel M3 and an Output Pulley M4 in the clockwise directions.

Applications

One of the applications of this system is to convert wave energy to electrical energy. This gear box will be capable of harnessing ALL the forces provided by the waves in ALL directions. In a deep water system the gear box can be mounted on a floating device. See FIG. 35. The Hollow Actuator Shaft S0 can be attached to a second floating device. Wave action will provide relative motion between the two floating devices in all directions. The gear box will unify all these motions onto a unidirectional rotating outer shaft that can actuate a hydraulic pump or an electric generator.

The various forces and torque that are applied on the Hollow Actuator Shaft S0 and Input Shaft S1 will be equal to the resistance offered by the electric generator or the hydraulic motor connected to the output shaft of the gear box. Higher the ratings of the electric motor or hydraulic pump higher the forces on the input shaft and the gear box. This feature is unique to this system as it can absorb forces that come from all directions. Any system not capable of absorbing forces from a given direction and if forces are applied from that direction then the system needs to structurally withstand that useless force. This requires stronger design and bigger geometry that does not really add value and increase cost.

Wave power can also be harnessed using different strategies depending on the water depth. In shallow water depths the Gear box can be mounted on a fixed structure above the water level. See FIGS. 36 and 20. In some cases the gear box can also be mounted on a frame that is immersed in water. The Hollow Actuator Shaft S0 can be attached to a floating device. Wave action will cause the floating device to move around in multiple directions. The gear box will unify all these motions onto a unidirectional rotating outer shaft that can actuate a hydraulic pump or an electric generator. The float can also be provided with vanes so that wave induced flowing water across the vanes can make the float rotate about the shaft S1's axis which can also be absorbed by the gear box.

Moving automobile—The Gear Box can be fixed to the automobile and a weight suspended on the driving end of Shaft S1. The movements experienced by the automobile will oscillate the pendulum and set the gear box in motion. The Gear Box can also be mounted on wheel axles and the driving end of Shaft S1 connected to the body of the automobile. The relative motion (generally absorbed by the shock absorbers) between the wheels and the body can be absorbed by the Gear Box and converted to unidirectional rotary motion.

Railway Trains—The Gear Box can be mounted on a coach and the driving end of Shaft S1 connected to the adjacent coach. The relative motion between the two coaches as they travel on tracks can be absorbed by the Gear Box and converted to unidirectional rotary motion.

Railway Track Vibrations—The gear arrangement can be used to pick up vibrations on railway tracks and convert them to unidirectional rotation. The gear arrangement can be mounted on the ground and the input shaft can be attached to the railway track.

Runaway Energy Harvesting—General run away energy in the form of vibration energy during a bumpy ride of an automobile, an animal driven carriage on an uneven road, or on a rocking boat can be absorbed. The gear arrangement in these cases can be fixed in an inverted position on a frame on the vehicle or boat with the input shaft S1/S0 hanging vertically down. See FIGS. 38A and 38B. A weight can be attached to S0/S1 driving end. During a bumpy ride the weight will oscillate as a pendulum in all directions. These oscillations are converted to unidirectional rotation to power a generator.

Other applications can be in any power transmission system of automobiles where the orientation of the output shaft of the driving system and the input shaft of a driven system are not aligned or their alignment changes during operations. For example, to accommodate the changing orientation between the output shaft of an automobile engine and the wheel axis of the automobile when the driving terrain has undulations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

GENERIC NOMENCLATURE: The abbreviated names for various components are given below:

| | |
|---|---|
| Point of Origin | O |
| Shafts | S |
| Bevel Gears | BG |
| Spur Gears | SG |
| One Way Bearing Bearings | OWB |
| Regular Bearings | RB |
| Thrust Bearings | TB |
| Bushing | BU |
| Miscellaneous (Sleeve, Housing, keys, pulley etc.) | M |

SPECIFIC NOMENCLATURE: Specific component, their abbreviated name with a numerical identifier is given below:

| | |
|---|---|
| Hollow Actuator Shaft | S0 |
| Input Shaft | S1 |
| Left Heave Pitch Shaft | S2a |
| Centre Heave Pitch Shaft | S2b |
| Right Heave Pitch Shaft | S2c |
| Intermediary Heave Pitch Roll and Surge Shaft | S3 |
| Sway and Yaw Shaft | S4 |
| Hollow Stepped Unidirectional Final Output Shaft | S5 |
| Intermediary Shaft for Idler Gear SG4 | S6 |
| Forward Roll/Surge Bevel Gear | BG1 |
| Rear Roll/Surge Bevel Gear | BG2 |
| Left Heave & Pitch Bevel Gear | BG3 |
| Right Heave & Pitch Bevel Gear | BG4 |
| Roll Surge Heave & Pitch Driven Bevel Gear | BG5 |
| Heave & Pitch Driven Bevel Gear | BG6 |
| Roll Surge Heave & Pitch Collector Bevel Gear | BG7 |
| Roll Surge Heave & Pitch Collector Spur Gear | SG1 |
| Roll Surge Heave & Pitch Driven Spur Gear | SG2 |
| Counter-clockwise Sway & Yaw Spur Intermediary Gear | SG3 |
| Counter-clockwise Sway & Yaw Idler Spur Gear | SG4 |
| Counter-clockwise Sway & Yaw Driven Internal Spur Gear | SG5 |
| Key on Shaft S1 | M1 |
| Upper Housing | M2a, M2b1, M2c |
| Lower Housing | M2d |
| Helical Groove on Shaft S0 | M3 |
| Flywheel | M4 |
| Output Pulley | M5 |
| One Way Bearing on Forward Roll/Surge Bevel Gears BG1 | OWB1 |
| One Way Bearing on Rear Roll/Surge Bevel Gears BG2 | OWB2 |
| One Way Bearing on Bevel Gear BG6 | OWB3 |
| One Way Bearing on Shaft S4/S5 | OWB4 |
| One Way Bearing on Shaft S4/Spur Gear SG3 | OWB5 |
| Bushing on Housing M2a | BU1 |
| Bushing on Housing M2c | BU2 |
| Bushing on Bevel Gear BG3 | BU3 |
| Bushing on Bevel Gears BG4, BG5 | BU4 |
| Stopper for Shaft S3 | ST1 |
| Stopper for Shaft S4 | ST2 |

What is claimed is:

1. An energy harvesting device for harvesting energy of a wave, motion of the wave resulting in pitch, sway, yaw, surge, roll, and heave movement, the energy harvesting device comprising:
 a housing assembly;
 an input shaft being configured to move in response to the movement of the wave;
 a roll and surge motion gear train extending from the input shaft to an output shaft;
 a pitch and heave motion gear train extending from the input shaft to the output shaft; and
 a sway and yaw motion gear train extending from the input shaft to the output shaft,
 wherein multiaxial translational and rotational motion of the input shaft is converted to unidirectional rotational motion of the output shaft, each of the roll and surge motion gear train, the pitch and heave motion gear train, and the sway and yaw motion gear train having at least a bevel hear, a connecting shaft, and a pair of one way bearings.

2. The energy harvesting device according to claim 1 wherein the housing assembly comprises an upper housing, a middle housing, and a lower housing; and
 the input shaft is rotatably coupled to a heave pitch shaft that is rigidly coupled to a right heave and pitch bevel gear that meshes with a roll surge heave and pitch driven bevel gear, a left heave and pitch bevel gear is rigidly attached to the roll surge heave and pitch driven bevel gear along a common axis and freely mounted on a sway and yaw shaft, an intermediary heave pitch roll and surge shaft freely supports the sway and yaw shaft, the middle housing freely supports the intermediary heave pitch roll and surge shaft, the left heave and pitch bevel gear meshes with the right heave and pitch bevel gear, an intermediary shaft is supported by the middle housing and rigidly carries a counter-clockwise sway and yaw idler spur gear, the lower housing freely supports the output shaft.

3. The energy harvesting device according to claim 2 wherein the heave pitch shaft is rotatably coupled to the upper housing which is rigidly coupled to the intermediary heave pitch roll and surge shaft, the middle housing freely supports the intermediary heave pitch roll and surge shaft, the intermediary heave pitch roll and surge shaft rigidly carries a counter-clockwise sway and yaw driven internal spur gear, a hollow stepped unidirectional final output shaft is supported by the middle housing.

4. The energy harvesting device according to claim 3 wherein the input shaft is further rigidly coupled to a forward roll and surge bevel gear that meshes with a rear roll and surge bevel gear that in turn meshes with the left heave and pitch bevel gear, the sway and yaw shaft is rigidly coupled to the left heave and pitch bevel gear and a roll and surge heave and pitch collector spur gear, the sway and yaw is freely mounted on the intermediary heave pitch roll and surge shaft, the roll surge heave and pitch collector spur gear meshes with a roll surge heave and pitch driven spur gear.

5. An energy harvesting device for harvesting energy of a wave, motion of the wave resulting in pitch, sway, yaw, surge, roll, and heave movement, the energy harvesting device comprising:
 a housing assembly having an upper housing, a middle housing, and a lower housing;
 an input shaft being configured to move in response to the movement of the wave,
 the input shaft being rotatably coupled to a heave pitch shaft that is rigidly coupled to a right heave and pitch bevel gear that meshes with a roll surge heave and pitch driven bevel gear, a left heave and pitch bevel gear is rigidly attached to the roll surge heave and pitch driven bevel gear along a common axis and freely mounted on a sway and yaw shaft, an intermediary heave pitch roll and surge shaft freely supports the sway and yaw shaft, the middle housing freely supports the intermediary heave pitch roll and surge shaft, the left heave and pitch bevel gear meshes with the right heave and pitch bevel gear, an intermediary shaft is supported by the middle housing and rigidly carries a counter-clockwise sway and yaw idler spur gear, the lower housing freely supports the output shaft;
 the heave pitch shaft being rotatably coupled to the upper housing which is rigidly coupled to the intermediary heave pitch roll and surge shaft, the middle housing freely supports the intermediary heave pitch roll and surge shaft, the intermediary heave pitch roll and surge shaft rigidly carries a counter-clockwise sway and yaw driven internal spur gear that meshes with a sixth spur gear, a hollow stepped unidirectional final output shaft is supported by the middle housing; and
 the input shaft is further rigidly coupled to a forward roll and surge bevel gear that meshes with a rear roll and surge bevel gear that in turn meshes with the left heave and pitch bevel gear, the sway and yaw shaft is rigidly coupled to the left heave and pitch bevel gear and a roll surge heave and pitch collector spur gear, the sway and yaw shaft is freely mounted on the intermediary heave pitch roll and surge shaft, the roll surge heave and pitch collector spur gear meshes with a roll surge heave and pitch driven spur gear,
 wherein multiaxial translational and rotational motion of the input shaft and the housing assembly is converted to unidirectional rotational motion of the output shaft.

6. The energy harvesting device according to claim 5 wherein the upper housing assembly comprises a pair of parallel plates interconnected with an orthogonal plate.

7. The energy harvesting device according to claim 6 wherein the heave pitch shaft is rotatably coupled between the pair of parallel plates of the upper housing assembly.

8. The energy harvesting device according to claim 6 wherein the intermediary heave pitch roll and surge shaft is rigidly coupled to the orthogonal plate of the upper housing assembly and rotatably coupled to the middle housing plate.

9. The energy harvesting device according to claim 5 wherein an axis of the heave pitch shaft is orthogonal to and intersecting with an axis of the input shaft.

10. The energy harvesting device according to claim 5 wherein an axis of the heave pitch shaft intersects the intersection point of the second shaft and first shaft.

11. The energy harvesting device according to claim 5 wherein an axis of the heave pitch shaft is orthogonal to and intersecting with an axis of the sway and yaw shaft.

12. The energy harvesting device according to claim 5 wherein the sway and yaw shaft is mounted rotatably on the intermediary heave pitch roll and surge shaft.

13. The energy harvesting device according to claim 5 comprising three gear trains of motion transfer from input shaft to the output shaft.

14. The energy harvesting device according to claim 13 wherein a roll and surge motion gear train commences with the input shaft and is transmitted by the forward roll and surge bevel gear, the rear roll and surge bevel gear, the left heave and pitch bevel gear, the sway and yaw shaft, the roll surge heave and pitch collector spur gear, the roll surge heave and pitch driven spur gear.

15. The energy harvesting device according to claim 13 wherein a pitch and heave motion gear train commences with the input shaft and is transmitted by the heave pitch shaft, the right heave and pitch bevel gear, the roll surge heave and pitch driven bevel gear, the third spur gear, and the counter-clockwise sway and yaw idler spur gear.

* * * * *